US008823692B2

(12) United States Patent
Yamamoto et al.

(10) Patent No.: US 8,823,692 B2
(45) Date of Patent: Sep. 2, 2014

(54) DISPLAY DEVICE, DRIVING METHOD FOR THE DISPLAY DEVICE, AND ELECTRONIC APPARATUS

(75) Inventors: Tetsuro Yamamoto, Kanagawa (JP); Katsuhide Uchino, Kanagawa (JP); Naobumi Toyomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 934 days.

(21) Appl. No.: 12/591,523

(22) Filed: Nov. 23, 2009

(65) Prior Publication Data

US 2010/0149152 A1 Jun. 17, 2010

(30) Foreign Application Priority Data

Dec. 17, 2008 (JP) ................................ 2008-320600

(51) Int. Cl.

| | |
|---|---|
| ***G06F 3/038*** | (2013.01) |
| ***G09G 5/00*** | (2006.01) |
| ***G09G 3/10*** | (2006.01) |
| ***G09G 3/32*** | (2006.01) |

(52) U.S. Cl.

CPC ........ *G09G 3/3233* (2013.01); *G09G 2320/045* (2013.01); *G09G 2300/0819* (2013.01); *G09G 2320/043* (2013.01); *G09G 2330/021* (2013.01)

USPC ......................... 345/211; 345/204; 315/169.3

(58) Field of Classification Search

CPC ..... G09G 3/36; G09G 3/3648; G09G 3/3685; G09G 3/3688

USPC ................ 345/204, 211–215; 315/168–169.4

See application file for complete search history.

(56) References Cited

U.S. PATENT DOCUMENTS

| | | | | |
|---|---|---|---|---|
| 7,212,186 | B2 * | 5/2007 | Harano | 345/99 |
| 8,094,146 | B2 * | 1/2012 | Yamamoto et al. | 345/212 |
| 2004/0252116 | A1 * | 12/2004 | Tobita | 345/211 |
| 2005/0007357 | A1 * | 1/2005 | Yamashita et al. | 345/204 |
| 2005/0062686 | A1 * | 3/2005 | Iguchi | 345/46 |
| 2005/0140414 | A1 * | 6/2005 | Senda | 327/261 |
| 2007/0268210 | A1 | 11/2007 | Uchino et al. | |
| 2008/0224964 | A1 * | 9/2008 | Tanikame et al. | 345/76 |
| 2008/0225025 | A1 * | 9/2008 | Uchino et al. | 345/204 |

FOREIGN PATENT DOCUMENTS

| | | |
|---|---|---|
| JP | 2007-310311 | 11/2007 |
| JP | 2008-233122 A | 10/2008 |
| JP | 2009-288749 A | 12/2009 |

OTHER PUBLICATIONS

Japanese Office Action issued Apr. 5, 2011 for corresponding Japanese Application No. 2008-320600.

* cited by examiner

*Primary Examiner* — Jonathan Horner

(74) *Attorney, Agent, or Firm* — Rader, Fishman & Grauer PLLC

(57) ABSTRACT

A display device includes: a pixel array unit in which pixels are arranged in a matrix shape, each of the pixels including an electro-optic element, a writing transistor that writes a video signal, a driving transistor that drives the electro-optic element according to the video signal written by the writing transistor, and a storage capacitor that is connected between a gate electrode and a source electrode of the driving transistor and stores the video signal written by the writing transistor; and a power supply line that supplies power supply potential to the pixels, the power supply potential selectively taking first potential for supplying an electric current to the driving transistor and second potential for applying reverse bias to the electro-optic element.

11 Claims, 17 Drawing Sheets

BEFORE t=t1 t=t1 t=t3

AFTER FIXED TIME ELAPSES FROM t3

THRESHOLD CORRECTION: NOT PERFORMED,
MOBILITY CORRECTION: NOT PERFORMED

THRESHOLD CORRECTION: PERFORMED,
MOBILITY CORRECTION: NOT PERFORMED

THRESHOLD CORRECTION: PERFORMED,
MOBILITY CORRECTION: PERFORMED

DISPLAY DEVICE, DRIVING METHOD FOR THE DISPLAY DEVICE, AND ELECTRONIC APPARATUS

BACKGROUND OF THE INVENTION

1. Field of the Invention

The present invention relates to a display device, a driving method for the display device, and an electronic apparatus, and, more particularly to a flat (flat panel) display device in which pixels including electro-optic elements are two-dimensionally arranged in a matrix shape, a driving method for the display device, and an electronic apparatus including the display device.

2. Description of the Related Art

In recent years, in the field of a display device that performs image display, flat display devices in which pixels (hereinafter also referred to as "pixel circuits" in some case) including light emitting elements are two-dimensionally arranged in a matrix shape are rapidly spread. As one of the flat display devices, there is a display device in which electro-optic elements of a so-called current drying type, light emission luminance of which changes according to a current value flowing to a device, are used as light emitting elements of pixels. As the electro-optic element of the current driving type, there is known an organic EL (Electro Luminescence) element that makes use of a phenomenon in which an organic thin film emits light when an electric field is applied thereto.

An organic EL display device in which organic EL elements are used as light emitting elements of pixels has characteristics explained below. The organic EL elements consume low power because the organic EL elements can be driven with applied voltage equal to or lower than 10 V. Since the organic EL elements are self-light emitting elements, visibility of an image is high compared with a liquid crystal display device that displays an image by controlling the intensity of light from a light source with a liquid crystal in each of pixels. Further, since a light source such as a backlight is unnecessary, it is easy to reduce weight and thickness of the organic EL display device. Moreover, since response speed of the organic EL elements is extremely high at about several microseconds, a residual image during moving image display does not occur.

In the organic EL display device, as in the liquid crystal display device, a simple (passive) matrix system and an active matrix system can be adopted as a driving system therefor. However, although a display device of the simple matrix system is simple in structure, a light emission period of electro-optic elements decreases according to an increase in scanning lines (i.e., the number of pixels). Therefore, it is difficult to realize a large and high-definition display device.

Therefore, in recent years, the development of a display device of the active matrix system that controls an electric current flowing to electro-optic elements with active elements, for example, insulated-gate field-effect transistors provided in pixels, in which the electro-optic elements are provided, is actively performed. As the insulated-gate field-effect transistors, in general, TFTs (Thin Film Transistors) are used. In the display device of the active matrix system, the electro-optic elements maintain light emission over a period of one frame. Therefore, it is easy to realize a large and high-definition display device.

In general, it is known that an I (current)-V (voltage) characteristic of the organic EL elements deteriorates as time elapses (so-called aged deterioration). In pixel circuits in which, in particular, N-channel TFTs are used as transistors for current-driving the organic EL elements (hereinafter referred to as "driving transistors"), when the I-V characteristic of the organic EL elements deteriorates with time, gate-to-source voltage Vgs of the driving transistors changes. As a result, light emission luminance of the organic EL elements changes. This occurs because the organic EL elements are connected to source electrode sides of the driving transistors.

This is more specifically explained below. Source voltage of the driving transistors depends on operating points of the driving transistors and the organic EL elements. When the I-V characteristic of the organic EL elements deteriorates, since the operating points of the driving transistors and the organic EL elements fluctuate, even if the same voltage is applied to gate electrodes of the driving transistors, the source voltage of the driving transistors changes. Therefore, since the gate-to-source voltage Vgs of the driving transistors changes, a current value flowing to the driving transistors changes. As a result, since a current value flowing to the organic EL elements also changes, light emission luminance of the organic EL elements changes.

In particular, in pixel circuits in which polysilicon TFTs are used, in addition to the aged deterioration of the I-V characteristic of the organic EL elements, transistor characteristics of the driving transistors change as time elapses and the transistor characteristics are different in each of pixels because of irregularity in a manufacturing process. In other words, there is irregularity in the transistor characteristics of the driving transistor in each of the pixels. Examples of the transistor characteristics include threshold voltage Vth of the driving transistors and mobility μ of semiconductor thin films included in channels of the driving transistors (hereinafter simply referred to as "mobility μ of the driving transistors").

When the transistor characteristics of the driving transistors are different in each of the pixels, irregularity occurs in a current value flowing to the driving transistor in each of the pixels. Therefore, even if the same voltage is applied the gate electrodes of the driving transistors among the pixels, irregularity occurs in light emission luminance of the organic EL elements among the pixels. As a result, uniformity of a screen is spoiled.

Therefore, in order to maintain the light emission luminance of the organic EL elements constant without being affected by the aged deterioration in the I-V characteristic of the organic EL elements, the aged deterioration in the transistor characteristics of the driving transistors, and the like, there is proposed a technique for imparting various correction (compensation) functions to the pixel circuit (see, for example, JP-A-2007-310311).

Examples of the correction functions include a compensation function for the fluctuation in the I-V characteristic of the organic EL elements, a correction function for the fluctuation in the threshold voltage Vth of the driving transistors, and a correction function for the fluctuation in the mobility μ of the driving transistors. In the following explanation, correction for the fluctuation in the threshold voltage Vth of the driving transistors is referred to as "threshold correction" and correction for the fluctuation in the mobility μ of the driving transistors is referred to as "mobility correction".

By imparting the various correction functions to each of the pixel circuits in this way, it is possible to maintain the light emission luminance of the organic EL elements constant without being affected by the aged deterioration in the I-V characteristic of the organic EL elements and the aged deterioration in the transistor characteristics of the driving transistors. As a result, it is possible to improve a display quality of the organic EL display device.

In the related art disclosed in JP-A-2007-310311, control of light emission and non-light emission of the organic EL elements is performed by appropriately switching the potential of a power supply line, to which drain electrodes of the driving transistors are connected, between first potential Vcc and second potential Vss. The first potential Vcc is power supply potential for supplying an electric current to the driving transistors and the second potential Vss is power supply potential for applying reverse bias to the organic EL elements.

SUMMARY OF THE INVENTION

Before the threshold correction processing is performed, processing for preparation for the threshold correction processing is performed. This processing for threshold correction preparation is performed by, when writing transistors are in a non-conduction state, switching the potential of the power supply line from the first potential Vcc to the second potential Vss and feeding an electric current from anodes of the organic EL elements to the power supply line through the driving transistors. Details of the processing is explained later.

In the processing for threshold correction preparation, when the potential of the power supply line is switched from the first potential Vcc to the second potential Vss, since an electric current flows through the driving transistors, source voltage of the driving transistors fluctuates. Then, the potential of a common power supply line to which the cathode electrodes of the organic EL elements are connected in common to all the pixels (cathode potential of the organic EL elements) swings. Specifically, the potential of the common power supply line substantially falls to a negative side, rises after that, and returns to the original potential after elapse of fixed time.

Since the threshold correction preparation is operation in row units, the threshold correction preparation is performed in a threshold correction period of a certain row. Therefore, the potential of the common power supply line swings during the threshold correction processing for the row. The swing in the potential of the common power supply line is input to the source electrode of the driving transistor in a pixel row (line), which is currently subjected to the threshold correction processing, according to coupling by parasitic capacitors Cel of the organic EL elements and changes source voltage of the driving transistor.

Specifically, when the potential of the common power supply line falls to the negative side, source voltage of the driving transistor in the pixel row currently subjected to the threshold correction processing falls. Consequently, the gate-to-source voltage Vgs of the driving transistor increases. Conversely, since the source voltage of the driving transistor rises according to the rise of the potential of the common power supply line, the gate-to-source voltage Vgs of the driving transistor decreases.

The fluctuation in the gate-to-source voltage Vgs of the driving transistor due to the swing in the potential of the common power supply line can be corrected by the threshold correction processing after the fluctuation if the fluctuation occurs near the start of the threshold correction processing. However, if the gate-to-source voltage Vgs of the driving transistor fluctuates near the end of the threshold correction processing, since threshold correction processing that should originally be performed is not performed, irregularity occurs in the light emission luminance and an image quality failure occurs.

Therefore, it is desirable to provide a display device, a driving method for the display device, and an electronic apparatus including the display device that can hold down the swing in the potential of the common power supply line in the threshold correction preparation period and suppress occurrence of an image quality failure due to the swing in the potential.

According to an embodiment of the present invention, there is provided a display device including:

a pixel array unit in which pixels are arranged in a matrix shape, each of the pixels including an electro-optic element, a writing transistor that writes a video signal, a driving transistor that drives the electro-optic element according to the video signal written by the writing transistor, and a storage capacitor that is connected between a gate electrode and a source electrode of the driving transistor and stores the video signal written by the writing transistor; and a power supply line that supplies power supply potential to the pixels, the power supply potential selectively taking first potential for supplying an electric current to the driving transistor and second potential for applying reverse bias to the electro-optic element, wherein time in which the potential of the power supply line changes from the first potential to the second potential at a preparation stage of threshold correction processing is set longer than time in which the potential of the power supply line changes from the second potential to the first potential before the threshold correction processing, the threshold correction processing being processing for changing, relative to initialized potential obtained when gate voltage of the driving transistor is initialized with reference potential, source voltage to potential obtained by subtracting threshold voltage of the driving transistor from the initialized potential.

If the time in which the potential of the power supply line from the first potential to the second potential at the preparation stage of the threshold correction processing is longer than the time in which the potential of the power supply line changes from the second potential to the first potential before the threshold correction processing, a current amount flowing to the power supply line through the driving transistor decreases. Then, since fluctuation in source voltage of the driving transistor during switching of the potential of the power supply line decreases, a swing in potential of a common power supply line to which the cathode electrode of the electro-optic element is connected in common to all the pixels decreases. As a result, a coupling amount input through a parasitic capacitor of the electro-optic element is held down with respect to source voltage of the driving transistor in a certain pixel row (line) near the end of the threshold correction processing. Therefore, the threshold correction processing is normally performed in the pixel row near the end of the threshold correction processing.

According to the embodiment of the present invention, by holding down the swing in the potential of the common power supply line in a threshold correction preparation period, it is possible to normally perform the threshold correction processing in the pixel row near the end of the threshold correction processing. Therefore, it is possible to suppress occurrence of an image quality failure due to the swing in the potential of the common power supply line.

BRIEF DESCRIPTION OF THE DRAWINGS

FIGS. 19A and 19B are perspective views of an external appearance of a digital camera to which the present invention is applied, wherein FIG. 19A is a perspective view of the external appearance viewed from a front side and FIG. 19B is a perspective view of the external appearance viewed from a rear side;

FIGS. 22A to 22G are external views of a cellular phone to which the present invention is applied, wherein FIG. 22A is a front view in an opened state, FIG. 22B is a side view in the opened state, FIG. 22C is a front view in a closed state, FIG. 22D is a left side view, FIG. 22E is a right side view, FIG. 22F is a top view, and FIG. 22G is a bottom view.

DESCRIPTION OF THE PREFERRED EMBODIMENTS

Best modes for carrying out the invention (hereinafter referred to as "embodiments") are explained in detail below with reference to the accompanying drawings. The embodiments are explained in order described below.

1. First Embodiment (a display device having 2Tr pixel configuration)
   1-1. System configuration
   1-2. Circuit operation
   1-3. Characteristics of the first embodiment
2. Second Embodiment (a display device of a unit scan system)
   2-1. System configuration
   2-2. Circuit operation
   2-3. Characteristics of the second embodiment
3. Modifications
4. Application examples (electronic apparatuses)

1. First Embodiment

1-1. System Configuration

Figure 1:
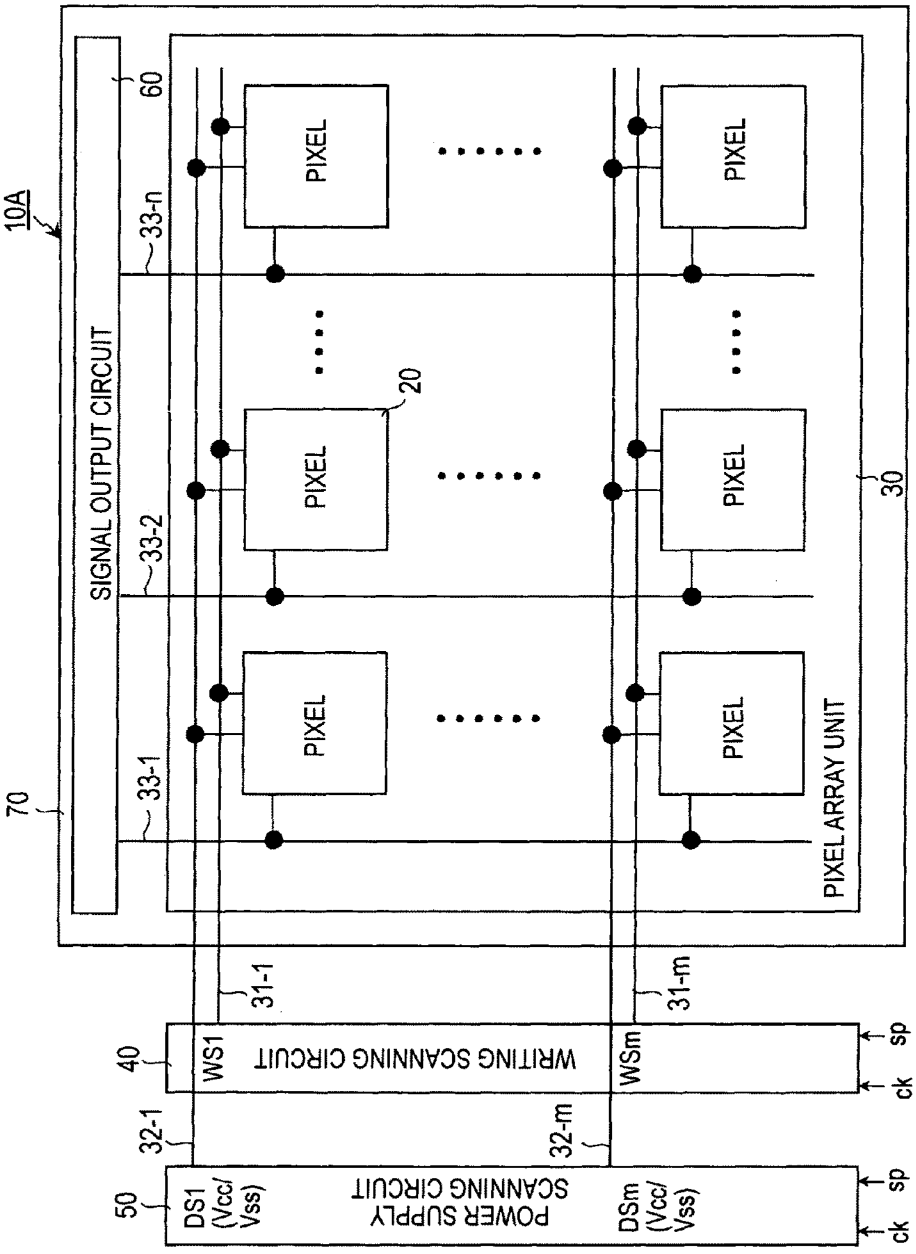
FIG. 1 is a schematic system diagram of a configuration of an organic EL display device according to an embodiment of the present invention.

FIG. 1 is a schematic system diagram of a configuration of an active matrix display device according to an embodiment of the present invention. As an example, an active matrix organic EL display device in which an electro-optic element of a current driving type, light emission luminance of which changes according to a current value flowing to a device, for example, an organic EL element is used as a light emitting element of a pixel (a pixel circuit) is explained.

As shown in FIG. 1, an organic EL display device 10A according to this embodiment includes plural pixels 20 including light emitting elements, a pixel array unit 30 in which the pixels 20 are two-dimensionally arranged in a matrix shape, and driving units arranged around the pixel array unit 30. The driving units drive the pixels 20 of the pixel array unit 30 to emit light.

As the driving units for the pixels 20, for example, a scanning driving system including a writing scanning circuit 40 and a power supply scanning circuit 50 and a signal supply system including a signal output circuit 60 are provided. In the case of the organic EL display device 10A according to this embodiment, the signal output circuit 60 is provided on a display panel (substrate) 70 on which the pixel array unit 30 is formed. On the other hand, the writing scanning circuit 40 and the power supply scanning circuit 50 included in the scanning driving system are provided on the outside of the display panel 70.

When the organic EL display device 10A is applicable to monochrome display, one pixel as a unit for formation of a monochrome image is equivalent to the pixel 20. On the other hand, when the organic EL display device 10A is applicable to color display, one pixel as a unit of formation of a color image includes plural sub-pixels. The sub-pixels are equivalent to the pixels 20. More specifically, in a display device for color display, one pixel includes, for example, three sub-pixels, i.e., a sub-pixel that emits red (R) light, a sub-pixel that emits green (G) light, and a sub-pixel that emits blue (B) light.

However, one pixel is not limited to a combination of the sub-pixels of the three primary colors R, G, and B. It is also possible to form one pixel by adding a sub-pixel(s) of one color or plural colors to the sub-pixels of the three primary colors. More specifically, for example, it is also possible to form one pixel by adding, for luminance improvement, one sub-pixel that emits white (W) light or form one pixel by adding, to expand a color reproduction range, at least one sub-pixel that emits complementary color light.

In the pixel array unit 30, scanning lines 31-1 to 31-*m* and power supply lines 32-1 to 32-*m* are wired for respective pixel rows along a row direction (an array direction of pixels in the pixel rows) relative to the array of the pixels 20 in m×n columns. Further, signal lines 33-1 to **33-*n*** are wired for respective pixel columns along a column direction (an array direction of pixels in the pixel columns).

The scanning lines 31-1 to **31-*m* are respectively connected to output ends of corresponding rows of the writing scanning circuit 40. The power supply lines 32-1 to 32-*m* are respectively connected to output ends of corresponding rows of the power supply scanning circuit 50. The signal lines 33-1 to 33-*n* are respectively connected to output ends of corresponding columns of the signal output circuit 60**.

Usually, the pixel array unit 30 is formed on a transparent insulating substrate such as a glass substrate. Consequently, the organic EL display device 10A has plane (flat) panel structure. A driving circuit for each of the pixels 20 of the pixel array unit 30 can be formed by using an amorphous silicon TFT or a low-temperature polysilicon TFT. When the low-temperature polysilicon TFT is used, the writing scanning circuit 40 and the power supply scanning circuit 50 can also be mounted on the display panel 70.

The writing scanning circuit 40 includes a shift register that shifts (transfers) a start pulse sp in order in synchronization with a clock pulse ck. When a video signal is written in the pixels 20 of the pixel array unit 30, the writing scanning circuit 40 scans the pixels 20 of the pixel array unit 30 in row units in order by sequentially supplying writing scanning signals WS (WS1 to WSm) to the scanning lines 31-1 to **31-*m*** (line sequential scanning).

The power supply scanning circuit 50 includes a shift register that shifts the start pulse sp in order in synchronization with the clock pulse ck. The power supply scanning circuit 50 supplies power supply potentials DS (DS1 to DSm), which are switched at first power supply potential Vcc and second power supply potential Vss lower than the first power supply potential Vcc, to the power supply lines 32-1 to **32-*m* in synchronization with the line sequential scanning by the writing scanning circuit 40. According to the switching of Vcc and Vss of the power supply potential DS, control of light emission and non-light emission of the pixels 20** is performed.

The signal output circuit 60 appropriately selects and outputs one of a signal voltage of a video signal (hereinafter simply referred to as "signal voltage" in some case) Vsig corresponding to luminance information supplied from a signal supply source (not shown in the figure) and reference potential Vofs. The reference potential Vofs selectively output from the signal output circuit 60 is potential as a reference of the signal voltage Vsig of the video signal (e.g., potential equivalent to a black level of the video signal).

As the signal output circuit 60, for example, a circuit configuration of a well-known time division driving system can be used. The time division driving system is also called sector system. Plural signal lines are allocated to one output terminal of a driver (not shown in the figure), which is a signal supply source, as a unit (a set). The plural signal lines are sequentially selected in a time division manner and, on the other hand, the signal lines are driven by allocating and supplying video signals output in time series for respective output terminals of the driver to the selected signal lines in a time division manner.

As an example, when the organic EL display device 10A is applicable to color display, with three pixel columns for R, G, and B adjacent to one another set as a unit, video signals of R, G, and B are input from the driver to the signal output circuit 60 in time series in one horizontal period. The signal output circuit 60 includes selectors (selection switches) provided to correspond to the three pixels rows for R, G, and B. When the selectors sequentially perform ON operation in a time division manner, the signal output circuit 60 writes the video signals of R, G, and B in signal lines corresponding thereto in a time division manner.

The three pixel columns (signal lines) for R, G, and B are set as a unit. However, the unit is not limited to this. If the number of time divisions is set to x (x is an integer equal to or larger than 2) by adopting the time division driving system (the selector system), there is an advantage that the number of outputs of the driver and the number of wires between the driver and the signal output circuit 60 and between the driver and the display panel 70 can be reduced to 1/x of the number of signal lines.

The signal voltage Vsig and the reference potential Vofs selectively output from the signal output circuit 60 are written in the pixels 20 of the pixel array unit 30 in row units via the signal lines 33-1 to **33-*n*. In other words, the signal output circuit 60** adopts a driving form of line sequential writing for writing the signal voltage Vsig in row (line) units.

Pixel Circuit

Figure 2:
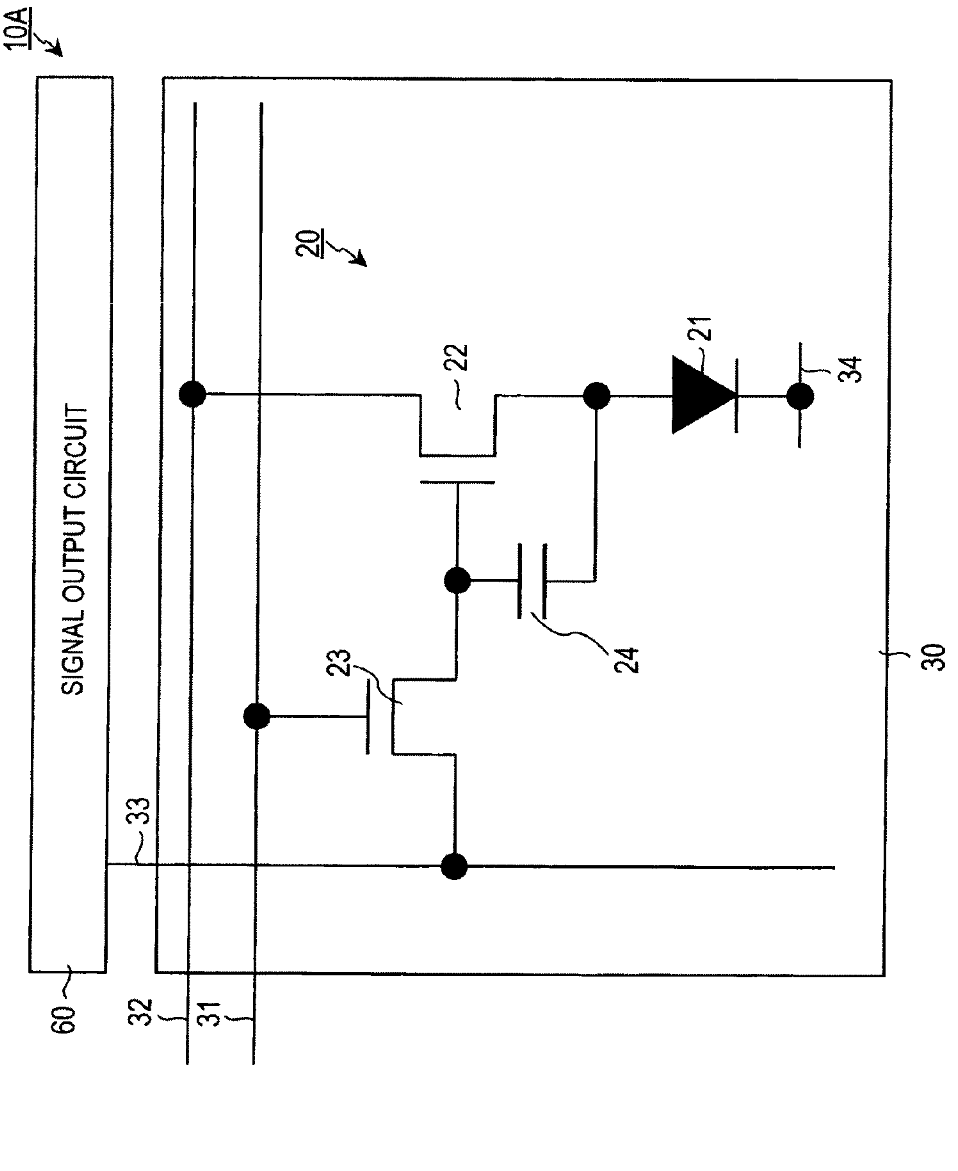
FIG. 2 is a circuit diagram of a basic circuit configuration of a pixel.

FIG. 2 is a circuit diagram of a specific configuration example of the pixel (pixel circuit) 20 used in the organic EL display device 10A according to an embodiment.

As shown in FIG. 2, the pixel 20 includes an electro-optic element of a current driving type, light emission luminance of which changes according to a current value flowing to a device, for example, an organic EL element 21 and a driving circuit that drives the organic EL element 21. A cathode electrode of the organic EL element 21 is connected to a common power supply line 34 wired in common to all the pixels 20 (so-called solid wiring).

The driving circuit that drives the organic EL element 21 includes a driving transistor 22, a writing transistor (a sampling transistor) 23, and a storage capacitor 24. N-channel TFTs are used as the driving transistor 22 and the writing transistor 23. A combination of conduction types of the driving transistor 22 and the writing transistor 23 is only an example and is not limited to this combination.

When the N-channel TFTs are used as the driving transistor 22 and the writing transistor 23, an amorphous silicon (a-Si) process can be used. It is possible to realize a reduction in cost of a substrate for forming a TFT and a reduction in cost of the organic EL display device 10A by using the a-Si process. If the combination of conduction types of the driving transistor 22 and the writing transistor 23 is a combination of the same conduction types, this can contribute to a reduction in cost because the both transistors 22 and 23 can be manufactured in the same process.

One electrode (a source-to-drain electrode) of the diving transistor 22 is connected to an anode electrode of the organic EL element 21 and the other electrode (a drain-to-source electrode) thereof is connected to the power supply line 32 (32-1 to **32-*m***).

A gate electrode of the writing transistor 23 is connected to the scanning line 31 (31-1 to **31-*m*), one electrode (a source-to-drain electrode) thereof is connected to the signal line 33 (33-1 to 33-*n*), and the other electrode (a drain-to-source electrode) thereof is connected to a gate electrode of the driving transistor 22**.

In the driving transistor 22 and the writing transistor 23, one electrode refers to a metal wire electrically connected to a source-to-drain region and the other electrode refers to a metal wire electrically connected to a drain-to-source region. One electrode may be a source electrode or a drain electrode and the other electrode may be a drain electrode or a source electrode according to a potential relation between the one electrode and the other electrode.

One electrode of the storage capacitor 24 is connected to the gate electrode of the driving transistor 22 and the other electrode thereof is connected to the other electrode of the driving transistor 22 and the anode electrode of the organic EL element 21.

The driving circuit for the organic EL element 21 is not limited to that having the circuit configuration including the two transistors, i.e., the driving transistor 22 and the writing transistor 23 and the one capacitative element, i.e., the storage capacitor 24. For example, it is also possible to adopt a circuit configuration in which an auxiliary capacitor for supplementing capacitance insufficiency of the organic EL element 21 is provided according to necessity with one electrode thereof connected to the anode electrode of the organic EL element 21 and the other electrode thereof connected to fixed potential.

In the pixel 20 having the configuration explained above, the writing transistor 23 comes into a conduction state in response to a high-active writing scanning signal WS applied from the writing scanning circuit 40 to the gate electrode through the scanning line 31. Consequently, the writing transistor 23 samples the signal voltage Vsig of the video signal corresponding to the luminance information supplied from the signal output circuit 60 through the signal line 33 or the reference potential Vofs and writes the signal voltage Vsig or the reference potential Vofs in the pixel 20. The written signal voltage Vsig or the reference potential Vofs is applied to the gate electrode of the driving transistor 22 and stored in the storage capacitor 24.

When the potential DS of the power supply line 32 (32-1 to 32-*m*) (hereinafter also referred to as "power supply potential" in some case) is at the first power supply potential Vcc, the driving transistor 22 operates in a saturation region with one electrode thereof acting as a drain electrode and the other electrode thereof acting as a source electrode. Consequently, the driving transistor 22 receives the supply of an electric current from the power supply line 32 and drives the organic EL element 21 to emit light with current driving. More specifically, the driving transistor 22 operates in the saturation region to thereby supply a driving current of a current value corresponding to a voltage value of the signal voltage Vsig stored in the storage capacitor 24 to the organic EL element 21 and current-drives the organic EL element 21 to thereby cause the organic EL element 21 to emit light.

In the driving transistor 22, when the power supply potential DS is switched from the first power supply potential Vcc to the second power supply potential Vss, one electrode functions as the source electrode and the other electrode functions as the drain electrode. The driving transistor 22 stops the supply of the driving current to the organic EL element 21 and brings the organic EL element 21 into a non-light emission state. In other words, the driving transistor 22 also has a function of a transistor for controlling light emission and non-light emission of the organic EL element 21.

In this way, a period in which the organic EL element 21 is in the non-light emission state (a non-light emission period) is provided according to the switching operation of the driving transistor 22 and a ratio of a light emission period and the non-light emission period of the organic EL element 21 is controlled (so-called duty control). A residual image blur involved in light emission of the pixel 20 over one frame period can be reduced by the duty control. Therefore, it is possible to further improve, in particular, an image quality of a moving image.

The first power supply potential Vcc of the first and second power supply potential Vcc and Vss selectively supplied from the power supply scanning circuit 50 through the power supply line 32 is power supply potential for supplying a driving current for driving the organic EL element 21 to emit light to the driving transistor 22. The second power supply potential Vss is power supply potential for applying reverse bias to the organic EL element 21. The second power supply potential Vss is set to potential lower than the reference potential Vofs as a reference of the signal voltage, for example, a potential lower than Vofs-Vth when a threshold voltage of the driving transistor 22 is Vth and, preferably, potential sufficiently lower than Vofs-Vth.

Pixel Structure

Figure 3:
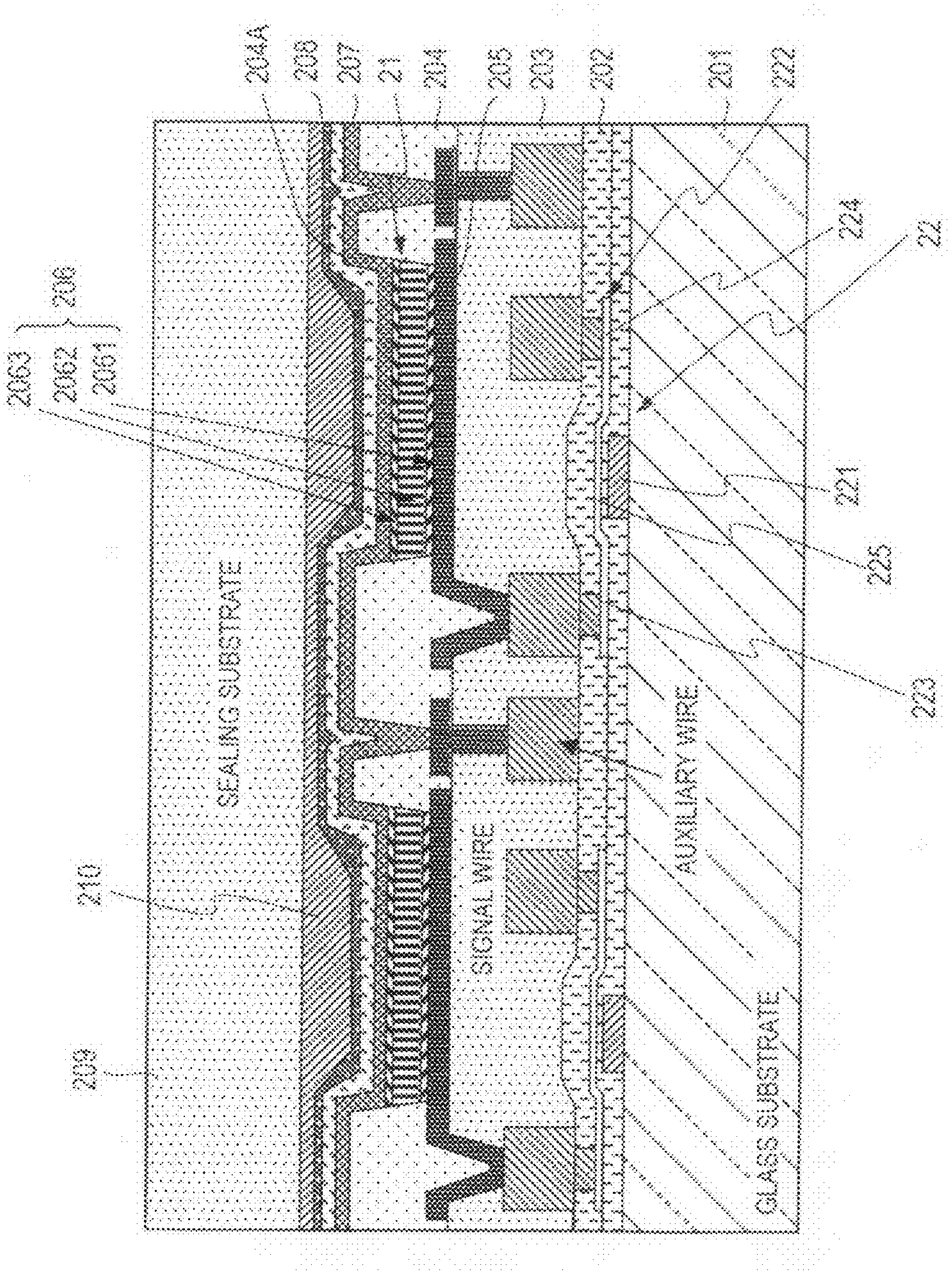
FIG. 3 is a sectional view of an example of sectional structure of the pixel.

FIG. 3 is a sectional view of an example of sectional structure of the pixel 20. As shown in FIG. 3, the pixel 20 is formed on a glass substrate 201 on which the driving circuit including the driving transistor 22 is formed. Specifically, an insulating film 202, an insulating planarized film 203, and a window insulating film 204 are formed on the glass substrate 201 in this order. The organic EL element 21 is provided in a recess 204A of the window insulating film 204. In the figure, only the driving transistor 22 among the components of the driving circuit is shown and the other components are omitted.

The organic EL element 21 includes an anode electrode 205 made of metal or the like, an organic layer 206 formed on the anode electrode 205, and a cathode electrode 207 made of a transparent conductive film or the like formed on the organic layer 206 in common to all the pixels. The anode electrode 205 is formed at the bottom of the recess 204A of the window insulating film 204.

In the organic EL element 21, the organic layer 206 is formed by sequentially depositing a hole transport layer/hole injection layer 2061, a light emitting layer 2062, an electron transport layer 2063, and an electron injection layer (not shown in the figure) on the anode electrode 205. An electric current flows from the driving transistor 22 to the organic layer 206 through the anode electrode 205 under the current driving by the driving transistor 22 shown in FIG. 2. Consequently, the organic EL element 21 emits light when electrons and holes are recombined in the light emitting layer 2062 in the organic layer 206.

The driving transistor 22 includes a gate electrode 221, a channel forming region 225 in a portion opposed to the gate electrode 221 of the semiconductor layer 222, and drain-to-source regions 223 and 224 on both the sides of the channel forming region 225 of the semiconductor layer 222. The drain-to-source region 223 is electrically connected to the anode electrode 205 of the organic EL element 21 via a contact hole.

As shown in FIG. 3, the organic EL element 21 is formed in pixel units on the glass substrate 201, on which the driving circuit including the driving transistor 22 is formed, via the insulating film 202, the insulating planarized film 203, and the window insulating film 204. A sealing substrate 209 is bonded by an adhesive 210 via a passivation film 208. The organic EL element 21 is sealed by the sealing substrate 209, whereby the display panel 70 is formed.

1-2. Circuit Operation

Figure 4:
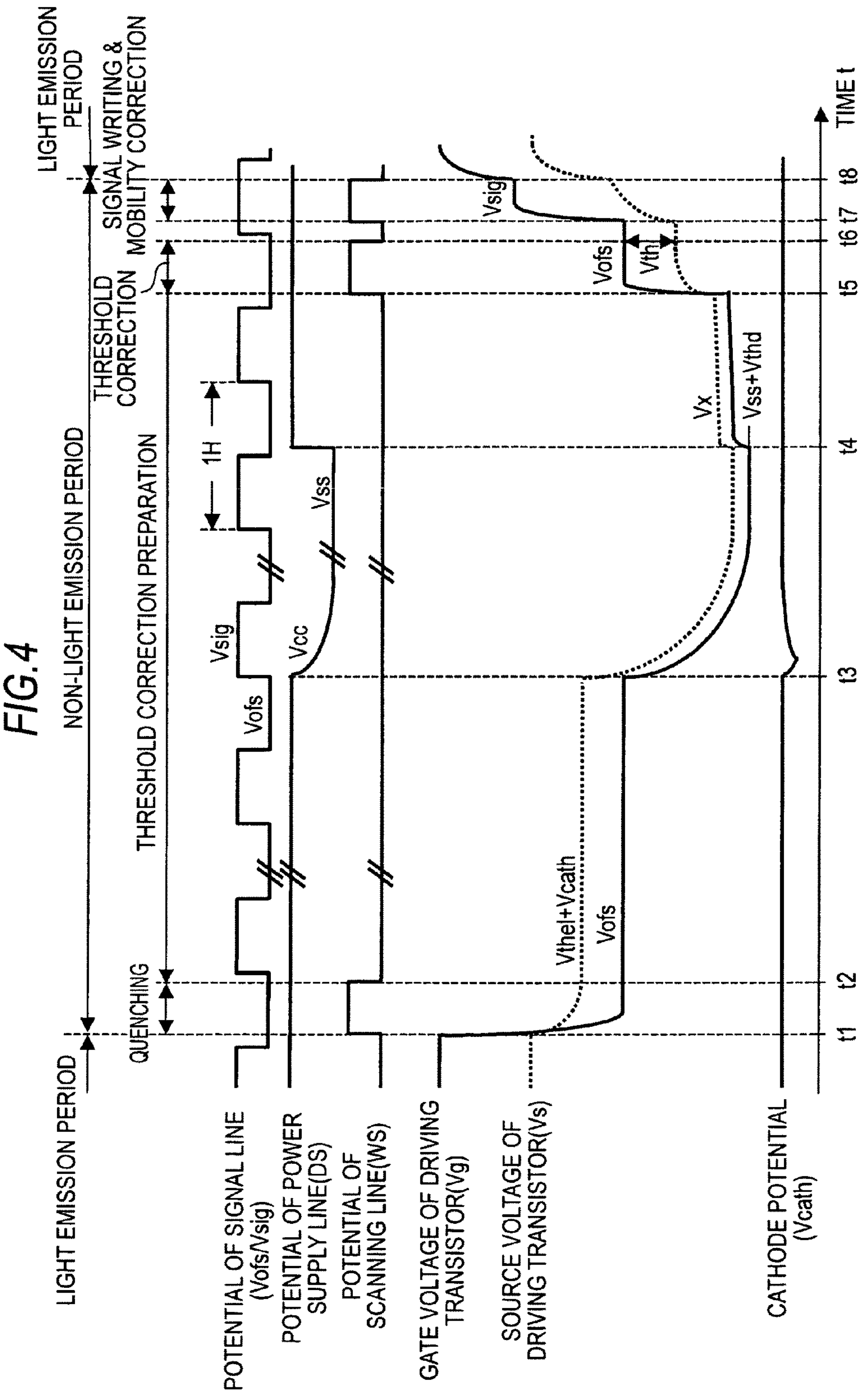
FIG. 4 is a timing waveform chart served for explanation of circuit operation of the organic EL display device according to an embodiment.

Circuit operation of the organic EL display device 10A in which the pixels 20 having the configuration explained above are two-dimensionally arranged in a matrix shape is explained on the basis of a timing waveform chart of FIG. 4 and with reference to operation explaining diagrams shown in FIGS. 5A to 6D.

In the operation explaining diagrams shown in FIGS. 5A to 6D, for simplification of the drawings, the writing transistor 23 is indicated by a symbol of a switch. As it is well known, the organic EL element 21 has the parasitic capacitor (an equivalent capacitor) Cel. Therefore, the parasitic capacitor Cel is also shown in the figure.

In the timing waveform chart of FIG. 4, changes in the potential (Vofs/Vsig) of the signal line 33, the potential (Vcc/Vss) DS of the power supply line 32, the potential (the writing scanning signal) WS of the scanning line 31, and the gate voltage Vg and the source voltage Vs of the driving transistor 22 are shown. As the potential of the signal line 33, the signal voltage Vsig of the video signal and the reference potential Vofs are switched in one horizontal period (one H period).

Light Emission Period of a Previous Frame

In the timing waveform chart of FIG. 4, a period before time t1 is a light emission period of the organic EL element 21 in a previous frame (field). In the light emission period of the previous frame, the potential DS of the power supply line 32 is at the first power supply potential Vcc and the potential of the scanning line 31 is in a low potential state. Therefore, the writing transistor 23 is in an OFF (non-conduction) state.

Figure 5A:
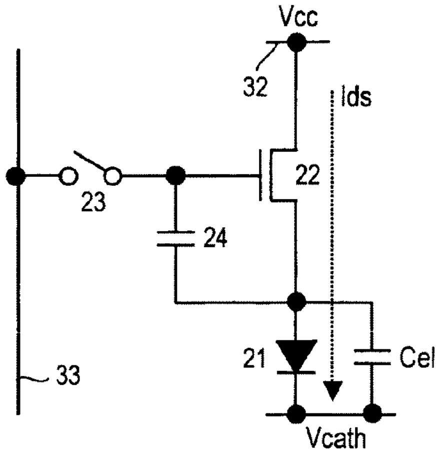
FIGS. 5A to 5D are first operation explaining diagrams served for explanation of the circuit operation of the organic EL display device according to an embodiment.

The driving transistor 22 is designed to operate in the saturation region. Therefore, as shown in FIG. 5A, an electric current Ids is supplied from the power supply line 32 to the organic EL element 21 through the driving transistor 22. The organic EL element 21 emits light at luminance corresponding to the current value. The electric current Ids flowing to the organic EL element 21 takes a value given by the following Formula (1) according to the gate-to-source voltage Vgs of the driving transistor 22:

$$Ids=(1/2)\cdot\mu(W/L)Cox(Vgs-Vth)^2 \quad (1)$$

where, μ represents carrier mobility of the driving transistor 22, W represents channel width, L represents channel length, and Cox represents gate capacity per unit area.

Non-Light Emission Period of a Present Frame

Figure 5B:
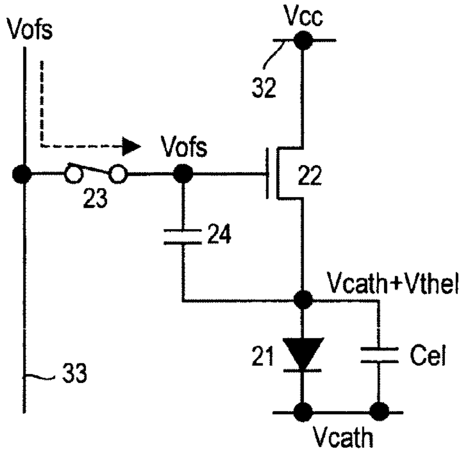

At time t1, the organic EL element 21 enters a new frame (a present frame) of line sequential scanning. At this point, the potential of the signal line 33 is in a state of the reference potential Vofs. The potential of the scanning line 31 transitions from a low potential side to a high potential side and the writing transistor 23 changes to an ON (conduction) state. Consequently, as shown in FIG. 5B, the reference potential Vofs is written in the gate electrode of the driving transistor 22. "The potential of the scanning line 31 transitions from the low potential side to the high potential side" means that the writing scanning signal ws changes to an active state.

Quenching

When the gate voltage Vg of the driving transistor 22 is equal to the reference potential Vofs, since the gate-to-source voltage Vgs of the driving transistor 22 is equal to or lower than the threshold voltage Vth, the driving transistor 22 changes to the OFF state. Consequently, since an electric current is not supplied from the driving transistor 22 to the organic EL element 21, the organic EL element 21 is quenched. At this point, voltage applied to the organic EL element 21 is threshold voltage Vthel of the organic EL element 21. Therefore, anode voltage of the organic EL element is a sum of the threshold voltage Vthel and cathode voltage Vcath of the organic EL element 21, i.e., Vthel+Vcath.

Threshold Correction Preparation

At time t2, the writing transistor 23 changes to the OFF state. At time t3 when fixed time elapses from time t2, the potential (the power supply potential) DS of the power supply line 32 is switched from the first power supply potential (hereinafter referred to as "high potential") Vcc to the second power supply potential (hereinafter referred to as "low potential") Vss. Time in which the power supply potential DS changes from the high potential Vcc to the low potential Vss is set longer than time in which the power supply potential DS changes from the low potential Vss to the high potential Vcc. Actions and effects thereof are explained later.

When the power supply potential DS changes to the low potential Vss, in the driving transistor 22, an electrode on the power supply potential DS side functions as the source electrode. At this point, as shown in FIG. 5C, an electric current flows through a path of the storage capacitor 24, the driving transistor 22, and the power supply line 32.

Consequently, the anode voltage of the organic EL element 21 falls as time elapses. At this point, the writing transistor 23 is in the OFF state and the gate electrode of the driving transistor 22 is electrically separated from the signal line 33 and is in a floating state. Therefore, the gate voltage Vg of the driving transistor 22 falls as time elapses in association with the anode voltage of the organic EL element 21.

Figure 5C:
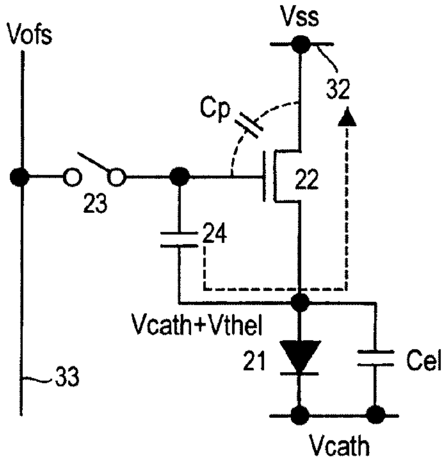

If the driving transistor 22 operates in the saturation region, i.e., if Vgs−Vthd≤Vds, as shown in FIG. 5C, a parasitic capacitor Cp is formed between the gate and the source of the driving transistor 22. Vthd indicates the threshold voltage between the gate and the source (the poser supply) of the driving transistor 22 and Vds indicates the drain-to-source voltage of the driving transistor 22.

Figure 5D:
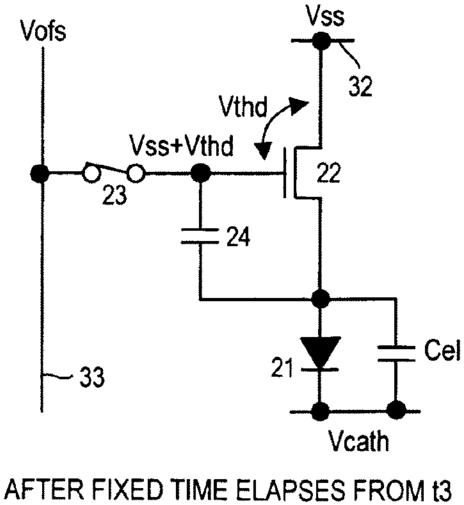

If the driving transistor 22 continues to operate in the saturation region, after fixed time elapses from time t3, as shown in FIG. 5D, the gate voltage Vg of the driving transistor 22 is Vss+Vthd.

Figure 6A:
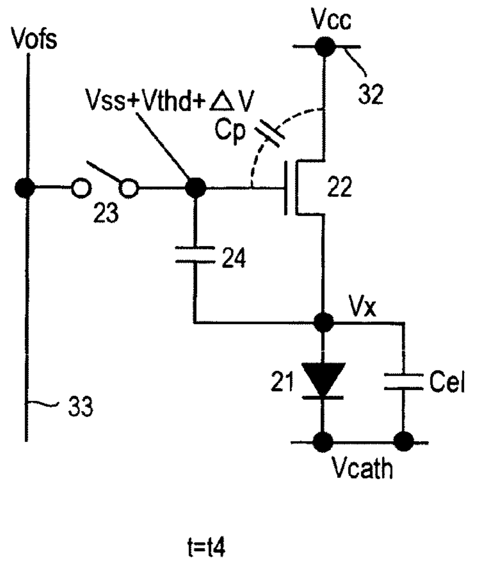
FIGS. 6A to 6D are second operation explaining diagrams served for explanation of the circuit operation of the organic EL display device according to an embodiment.

At time t4, the potential DS of the power supply line 32 is switched from the low potential Vss to the high potential Vcc. At this point, as shown in FIG. 6A, coupling is input to the gate electrode of the driving transistor 22 via the parasitic capacitor Cp between the gate and the source. In FIG. 6A, a coupling amount input to the gate electrode of the driving transistor 22 is represented as ΔVc and the anode voltage of the organic EL element 21 is represented as Vx.

When the potential DS of the power supply line 32 changes to the high potential Vcc, the organic EL element 21 side of the driving transistor 22 functions as the source electrode. Consequently, an electric current corresponding to the gate-to-source voltage (a gate-to-anode voltage) Vgs of the driving transistor 22 flows from the power supply line 32 to the anode electrode of the organic EL element 21 via the driving transistor 22. At this point, if the gate-to-source voltage Vgs of the driving transistor 22 is smaller than the threshold voltage Vth, the gate voltage Vg and the source voltage Vs of the driving transistor 22 hardly rise because of the electric current flowing to the driving transistor 22.

Threshold Correction

At time t5 when the potential of the signal line 33 is in the state of the reference potential Vofs, since the potential of the scanning line 31 transitions from the low potential side to the high potential side, the writing transistor 23 changes to the ON state. Consequently, the gate voltage Vg of the driving transistor 22 changes to the reference potential Vofs. In other words, the gate voltage Vg of the driving transistor 22 is initialized to the reference potential Vofs. The reference potential Vofs is referred to as initialized voltage of the gate voltage Vg of the driving transistor 22.

An amount of change of the gate voltage Vg involved in the initialization is input to the source electrode of the driving transistor 22 at a fixed ratio determined by the storage capacitor 24, a parasitic capacitor Cgs between the gate and the source of the driving transistor 22, and the parasitic capacitor Cel of the organic EL element 21. The input ratio is represented as G. The input ratio G takes a value given by the following Formula (2):

$$G=(Ccs+Cgs)/(Ccs+Cgs+Cel) \quad (2)$$

where, Ccs indicates a capacitance value of the storage capacitor 24.

Figure 6B:
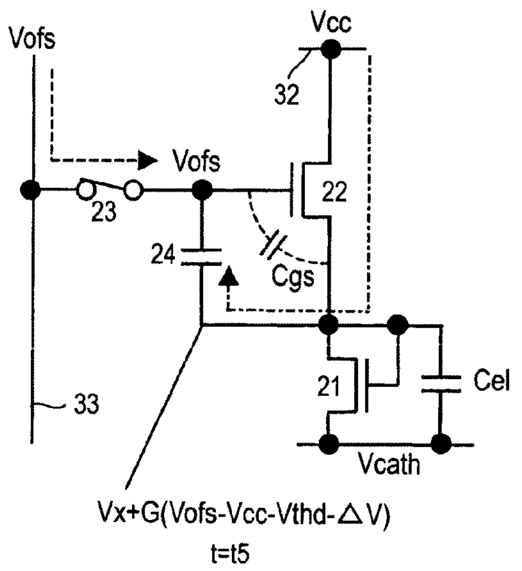

In this state, if the gate-to-source voltage Vgs of the driving transistor 22 is larger than the threshold voltage Vth thereof, as shown in FIG. 6B, an electric current flows through a path of the power supply line 32, the driving transistor 22, and the storage capacitor 24. In other words, it is necessary to set values of the reference potential Vofs and the low potential Vss such that the gate-to-source voltage Vgs of the driving transistor 22 at this point is larger than the threshold voltage Vth thereof.

Since an equivalent circuit of the organic EL element 21 is represented by a diode and a capacitor, as long as Vel≤Vcath+Vthel, the electric current of the driving transistor 22 is used for charging the storage capacitor 24 and the parasitic capacitor Cel of the organic EL element 21. Vel≤Vcath+Vthel means that a leak current of the organic EL element 21 is smaller than the electric current flowing to the driving transistor 22.

Figure 7:
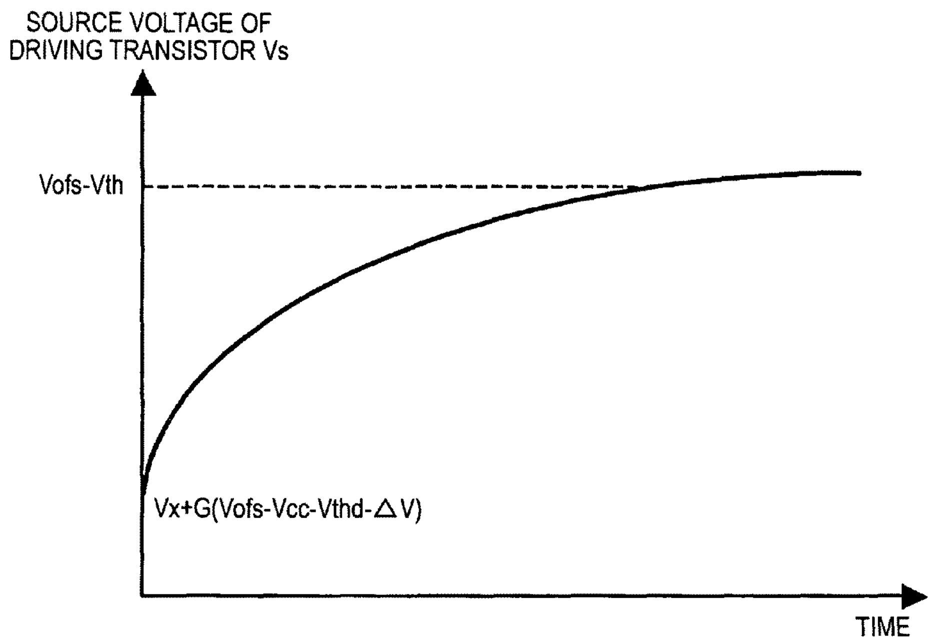
FIG. 7 is a graph of a change in source voltage Vs of a driving transistor according to elapse of time during threshold correction processing.

Since the storage capacitor 24 and the parasitic capacitor Cel of the organic EL element 21 are charged by the electric current of the driving transistor 22, the anode voltage of the organic EL element 21, i.e., the source voltage Vs of the driving transistor 22 rises as time elapses as shown in FIG. 7. After fixed time elapses, the gate-to-source voltage Vgs of the driving transistor 22 converges on the threshold voltage Vth thereof. At this point, Vel=Vofs−Vth≤Vcath+Vthel.

Processing for changing, relative to the initialized potential Vofs of the gate voltage Vg of the driving transistor 22, the source voltage Vs to potential obtained by subtracting the threshold voltage Vth of the driving transistor 22 from the initialized potential Vofs is referred to as threshold correction processing. When the threshold correction processing proceeds, as explained above, the gate-to-source voltage Vgs of the driving transistor 22 converges on the threshold voltage Vth of the driving transistor 22. Voltage equivalent to the threshold voltage Vth is stored in the storage capacitor 24.

It is necessary to allow an electric current to flow solely to the storage capacitor 24 side and prevent the electric current from flowing to the organic EL element 21 side in a period in which the threshold correction processing is performed (a threshold correction period). Therefore, the potential Vcath of the common power supply line 34 is set such that the organic EL element 21 is in a cutoff state.

At time t6, when the potential WS of the scanning line 31 transitions from the high potential side to the low potential side, the writing transistor 23 changes to the OFF state. At this point, the gate electrode of the driving transistor 22 is electrically separated from the signal line 33 to thereby change to the floating state. However, since the gate-to-source voltage Vgs is equal to the threshold voltage Vth of the driving transistor 22, the driving transistor 22 is in the cutoff state. Therefore, the drain-to-source current Ids does not flow to the driving transistor 22.

Signal Writing and Mobility Correction

Figure 6C:
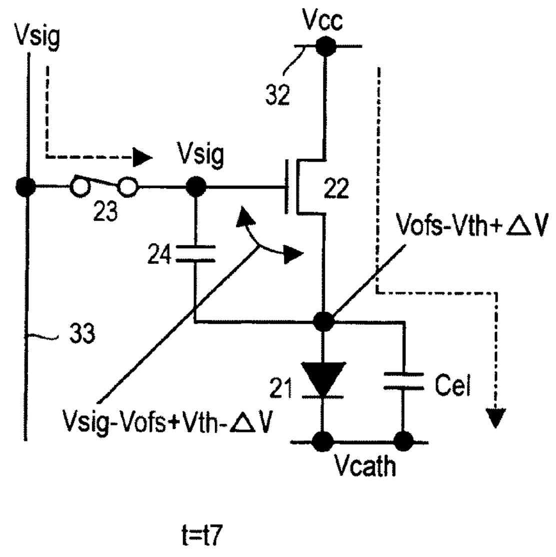

At time t7 when the potential of the signal line 33 is in a state of the signal voltage Vsig of the video signal, the potential WS of the scanning line 31 transitions from the low potential side to the high potential side. Therefore, as shown in FIG. 6C, the writing transistor 23 changes to the ON state again and writes the signal voltage Vsig. The signal voltage Vsig of the video signal is voltage corresponding to gradation.

The gate voltage Vg of the driving transistor 22 changes to the signal voltage Vsig according to the writing of the signal voltage Vsig by the writing transistor 23. In the driving of the driving transistor 22 with the signal voltage Vsig of the video signal, the threshold voltage Vth of the driving transistor 22 and the voltage equivalent to the threshold voltage Vth stored in the storage capacitor 24 cancel each other. Details of a principle of this threshold cancellation are explained later.

At this point, the organic EL element 21 is in the cutoff state (a high impedance state). Therefore, the electric current (the drain-to-source current Ids) flowing from the power supply line 32 to the driving transistor 22 according to the signal voltage Vsig of the video signal flows into the parasitic capacitor Cel of the organic EL element 21. Charging of the parasitic capacitor Cel of the organic EL element 21 is started by the drain-to-source current Ids.

The source voltage Vs of the driving transistor 22 rises as time elapses according to the charging of the parasitic capacitor Cel. At this point, irregularity of the threshold voltage Vth of the driving transistor 22 in each of the pixels is cancelled. The drain-to-source current Ids of the driving transistor 22 depends on (reflects) the mobility μ of the driving transistor 22.

Figure 8:
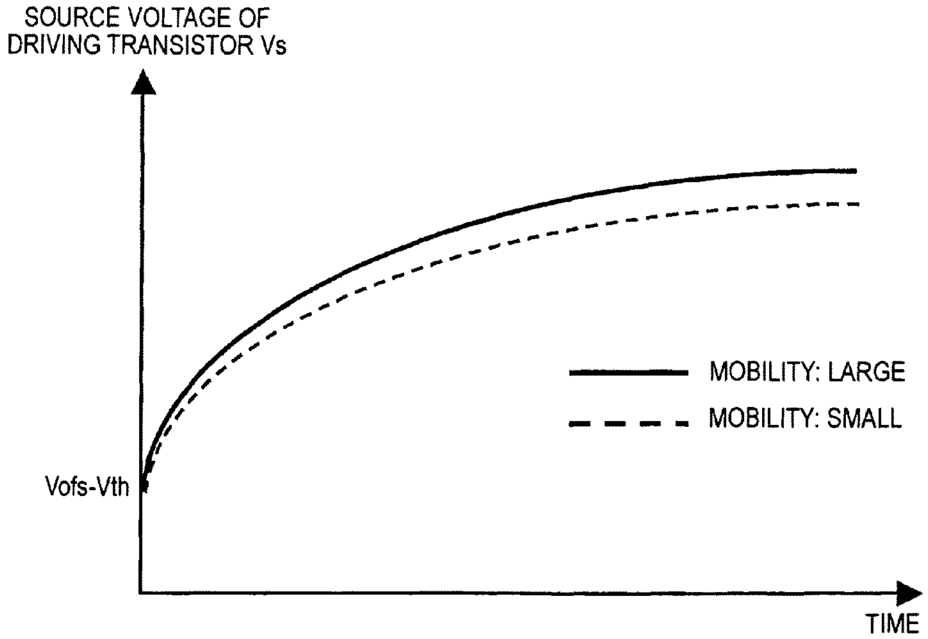
FIG. 8 is a graph of a change in the source voltage Vs of the driving transistor according to elapse of time during mobility correction processing.

Specifically, as shown in FIG. 8, the driving transistor 22 with large mobility μ has a large current value at that point and the source voltage Vs quickly rises. Conversely, the driving transistor 22 with small mobility μ has a small current value at that point and the source voltage Vs slowly rises. Consequently, the gate-to-source voltage Vgs of the driving transistor 22 falls reflecting the mobility μ and, after elapse of fixed time, is completely a voltage value for correcting the mobility μ.

It is assumed that a ratio of the stored voltage Vgs of the storage capacitor 24 to the signal voltage Vsig of the video signal is 1 (an ideal value). The ratio of the stored voltage Vgs to the signal voltage Vsig may be also referred to as writing gain. When the source voltage Vs of the driving transistor 22 rises to potential Vofs−Vth+ΔV, the gate-to-source voltage Vgs of the driving transistor 22 changes to Vsig−Vofs+Vth−ΔV.

An amount of rise ΔV of the source voltage Vs of the driving transistor 22 acts to be subtracted from the voltage (Vsig−Vofs+Vth) stored in the storage capacitor 24. The amount of rise ΔV of the source voltage Vs acts to discharge charges of the storage capacitor 24 and is subjected to negative feedback. Therefore, the amount of rise ΔV of the source voltage Vs of the driving transistor 22 is a feedback amount of the negative feedback.

In this way, by applying the negative feedback to the gate-to-source voltage Vgs with the feedback amount ΔV corresponding to the drain-to-source current Ids flowing to the driving transistor 22, it is possible to cancel the dependency of the drain-to-source current Ids of the driving transistor 22 on the mobility μ. This processing for canceling the dependency on the mobility μ is mobility correction processing for correcting irregularity in the mobility μ of the driving transistor 22 in each of the pixels.

More specifically, since the drain-to-source current Ids is larger as signal amplitude Vin (=Vsig−Vofs) of the video signal written in the gate electrode of the driving transistor 22 is higher, an absolute value of the feedback amount ΔV of the negative feedback is also larger. Therefore, the mobility correction processing corresponding to a light emission luminance level is performed.

When the signal amplitude Vin of the video signal is fixed, since the absolute value of the feedback amount ΔV of the negative feedback is larger as the mobility μ of the driving transistor 22 is larger, irregularity in the mobility μ in each of the pixels can be eliminated. Therefore, it can also be said that the feedback amount ΔV of the negative feedback is a correction amount of mobility correction. Details of a principle of the mobility correction are explained later.

Light Emission Period of the Present Frame

Figure 6D:
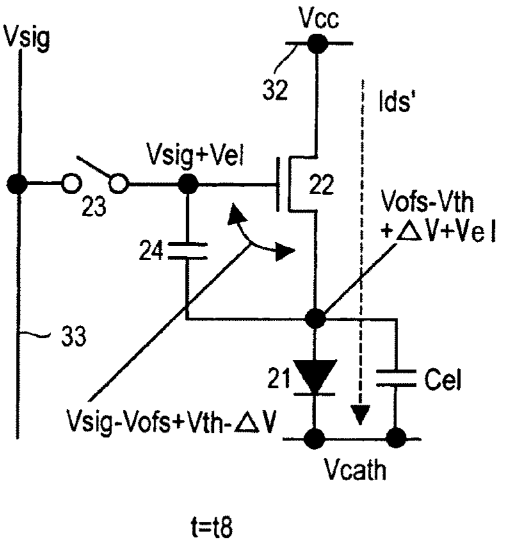

When the potential WS of the scanning line 31 transitions from the high potential side to the low potential side at time t8, as shown in FIG. 6D, the writing transistor 23 changes to the OFF state. Consequently, since the gate electrode of the driving transistor 22 is electrically separated from the signal line 33, the gate electrode changes to the floating state.

When the gate electrode of the driving transistor 22 is in the floating state, the storage capacitor 24 is connected to between the gate and the source of the driving transistor 22. Therefore, the gate voltage Vg fluctuates in association with (following) fluctuation in the source voltage Vs of the driving transistor 22. The operation of the gate voltage Vg of the driving transistor 22 fluctuating in association with fluctuation in the source voltage Vs in this way is referred to as boot strap operation by the storage capacitor 24 in this specification.

The gate electrode of the driving transistor 22 changes to the floating state and, at the same time, a drain-to-source current Ids' of the driving transistor 22 starts to flow to the organic EL element 21. Then, the anode voltage of the organic EL element 21 rises according to the drain-to-source current Ids' of the driving transistor 22.

When the anode voltage of the organic EL element 21 exceeds Vthel+Vcath, since the driving current Ids' starts to flow to the organic EL element 21, the organic EL element 21 starts to emit light. The rise in the anode voltage of the organic EL element 21 is nothing but the rise in the source voltage Vs of the driving transistor 22. When the source voltage Vs of the driving transistor 22 rises, the gate voltage Vg of the driving transistor 22 also rises in association with the rise in the source voltage Vs according to the boot strap operation of the storage capacitor 24.

When it is assumed that a boot strap gain is 1 (an ideal value), an amount of rise in the gate voltage Vg of the driving transistor 22 is equal to an amount of rise in the source voltage Vs. Therefore, the gate-to-source voltage Vgs of the driving transistor 22 is maintained constant at Vsig−Vofs+Vth−ΔV in the light emission period.

In a series of circuit operation explained above, the processing operations of the threshold correction preparation, the threshold correction, the writing of the signal voltage Vsig (signal writing), and the mobility correction are executed in one horizontal scanning period (1 H). The processing operations of the signal writing and the mobility correction are executed in parallel in a period of time t7 to t8.

In the example explained above, the driving method for executing the threshold correction processing only once is adopted. However, the driving method is only an example. A driving method is not limited to this driving method. For example, it is also possible to adopt a driving method for performing so-called divided threshold correction for dividedly executing the threshold correction processing plural times in, in addition to the 1 H period in which the threshold correction processing is performed together with the mobility correction and the signal writing processing, plural horizontal scanning periods prior to the 1 H period.

By adopting this driving method for divided threshold correction, even if time allocated to the one horizontal scanning period is reduced because of an increase of pixels involved in an increase in definition, it is possible to secure sufficient time over plural horizontal scanning period as a threshold correction period. Therefore, it is possible to surely perform the threshold correction processing.

Principle of the Threshold Cancellation

The principle of the threshold correction (i.e., the threshold cancellation) of the driving transistor 22 is explained. As explained above, the threshold correction processing is processing for changing, relative to the initialized potential Vofs of the gate voltage Vg of the driving gate transistor 22, the source voltage Vs of the driving transistor 22 to the potential obtained by subtracting the threshold voltage Vth of the driving transistor 22 from the potential Vofs.

Since the driving transistor 22 is designed to operate in the saturation region, the driving transistor 22 operates as a constant current source. Since the driving transistor operates as the constant current source, the fixed drain-to-source current (driving current) Ids given by Formula (1) is supplied from the driving transistor 22 to the organic EL element 21.

Figure 9:
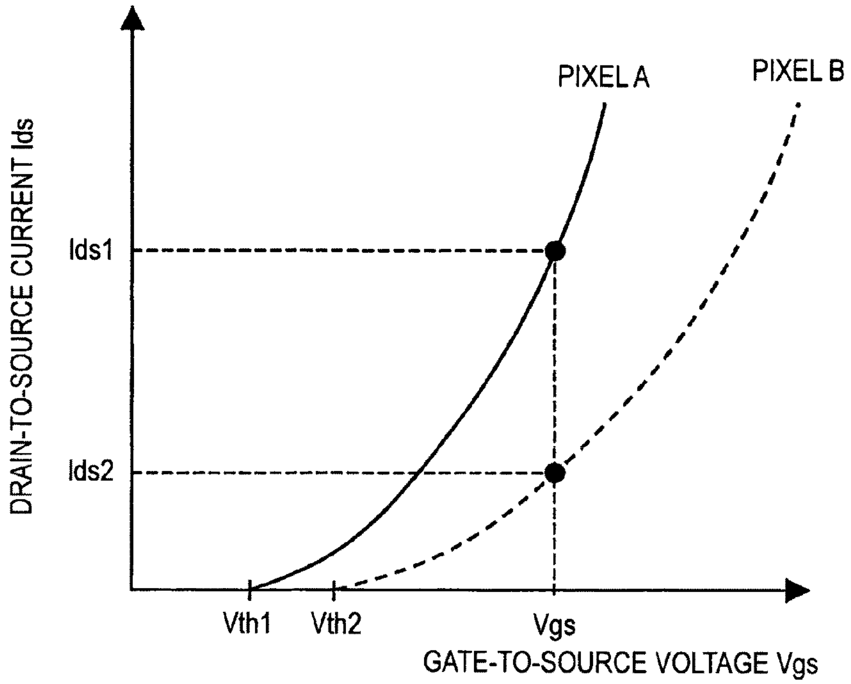
FIG. 9 is a characteristic chart served for explanation of a problem due to irregularity of threshold voltage Vth of the driving transistor.

A characteristic of the drain-to-source current Ids vs. the gate-to-source voltage of the driving transistor 22 is shown in FIG. 9.

As shown in this characteristic chart, unless correction for fluctuation in the threshold voltage Vth of the driving transistor 22 in each of the pixels is performed, when the threshold voltage Vth is Vth1, the drain-to-source current Ids corresponding to the gate-to-source voltage Vgs is Ids1.

On the other hand, when the threshold voltage Vth is Vth2 (Vth2>Vth1), the drain-to-source current Ids corresponding to the same gate-to-source voltage Vgs is Ids2 (Ids2<Ids). In other words, when the threshold voltage Vth of the driving transistor 22 fluctuates, even if the gate-to-source voltage Vgs of the driving transistor 22 is fixed, the drain-to-source current Ids fluctuates.

In the pixel (the pixel circuit) 20 having the configuration explained above, as explained above, the gate-to-source voltage Vgs of the driving transistor 22 during light emission is Vsig−Vofs+Vth−ΔV. Therefore, when the gate-to-source voltage Vgs is substituted in Formula (1), the drain-to-source current Ids is represented by the following Formula (3):

$$Ids=(1/2)\cdot\mu(W/L)Cox(Vsig-Vofs-\Delta V)^2 \quad (3)$$

The term of the threshold voltage Vth of the driving transistor 22 is cancelled. The drain-to-source current Ids supplied from the driving transistor 22 to the organic EL element 21 does not depend on the threshold voltage Vth of the driving transistor 22. As a result, even if the threshold voltage Vth of the driving transistor 22 fluctuates in each of the pixels because of irregularity and aged deterioration in a manufacturing process for the driving transistor 22, the drain-to-source current Ids does not fluctuate. Therefore, it is possible to maintain light emission luminance of the organic EL element 21 constant.

Principle of the Mobility Correction

The principle of the mobility correction of the driving transistor 22 is explained. As explained above, the mobility correction processing is processing for applying the negative feedback to a potential difference between the gate and the source of the driving transistor 22 with the correction amount ΔV corresponding to the drain-to-source current Ids flowing to the driving transistor 22. It is possible to cancel the dependency of the drain-to-source current Ids of the driving transistor 22 on the mobility μ according to the mobility correction processing.

Figure 10:
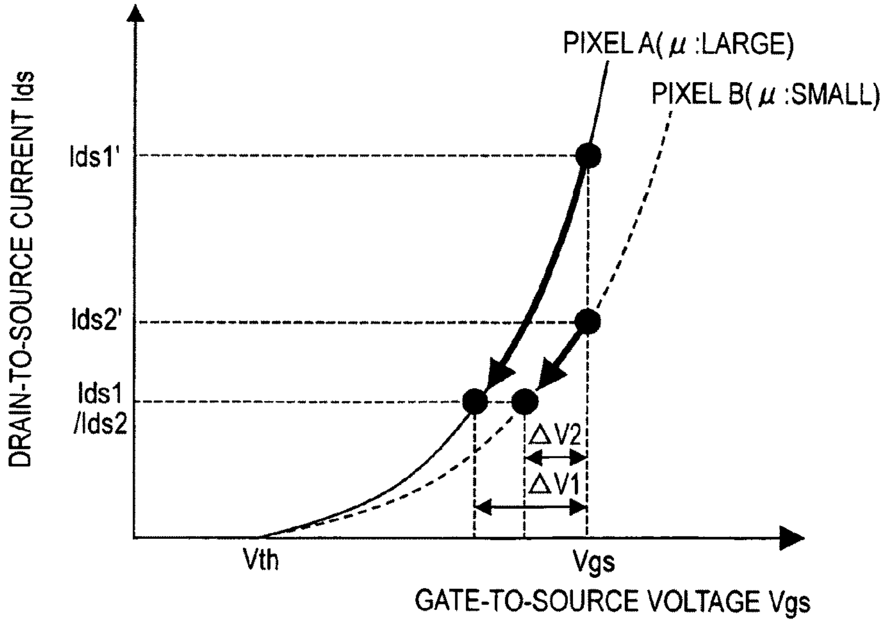
FIG. 10 is a characteristic chart served for explanation of a problem due to irregularity of mobility μ of the driving transistor.

Characteristic curves of a pixel having relatively large mobility μ of the driving transistor 22 and a pixel B having relatively small mobility μ of the driving transistor 22 compared with each other are shown in FIG. 10. When the driving transistor 22 includes a polysilicon thin film transistor, as in the pixels A and B, it is inevitable that the mobility μ is irregular among the pixels.

For example, the signal amplitude Vin (=Vsig−Vofs) at the same level for both the pixels A and B is written in the gate electrode of the driving transistor 22 in a state in which there is irregularity in the mobility μ between the pixel A and the pixel B. In this case, if the correction of the mobility μ is not performed, a large difference occurs between a drain-to-source current Ids1' flowing to the pixel A having the large mobility μ and a drain-to-source current Ids2' flowing to the pixel B having the small mobility μ. When a large difference occurs in the drain-to-source current Ids between the pixels because of irregularity in the mobility μ in each of the pixels, uniformity of a screen is spoiled.

As it is evident from the transistor characteristic expression of Formula (1), the drain-to-source current Ids is large as the mobility μ is large. Therefore, a feedback amount ΔV in the negative feedback is larger as the mobility μ is larger. As shown in FIG. 10, a feedback amount ΔV1 of the pixel A having the large mobility μ is large compared with a feedback amount ΔV2 of the pixel B having small mobility μ.

Therefore, the negative feedback is applied to the gate-to-source voltage Vgs with the feedback amount μV corresponding to the drain-to-source current Ids of the driving transistor 22 according to the mobility correction processing. Consequently, the negative feedback is applied more substantially as the mobility μ is larger. As a result, it is possible to suppress fluctuation in the mobility μ in each of the pixels.

Specifically, when correction with the feedback amount ΔV1 is applied in the pixel A with the large mobility μ, the drain-to-source current Ids substantially falls from Ids1' to ids1. On the other hand, since the feedback amount ΔV2 of the pixel B with the small mobility μ is small, the drain-to-source current Ids falls from Ids2' to Ids2 and does not substantially fall. As a result, the drain-to-source current Ids1 of the pixel A and the drain-to-source current Ids2 of the pixel B are substantially equal. Therefore, irregularity in the mobility μ in each of the pixels is corrected.

Summarizing the above explanation, when there are the pixel A and the pixel B with different mobilities μ, the feedback amount ΔV1 of the pixel A with the large mobility μ is large compared with the feedback amount ΔV2 of the pixel B with the small mobility μ. In other words, in a pixel with larger mobility μ, the feedback amount ΔV is larger and an amount of decrease in the drain-to-source current Ids is larger.

Therefore, current values of the drain-to-source current Ids of the pixels with the different mobilities μ are uniformalized by applying the negative feedback to the gate-to-source voltage Vgs with the feedback amount ΔV corresponding to the drain-to-source current Ids of the driving transistor 22. As a result, it is possible to correct irregularity in the mobility μ in each of the pixels. Specifically, the processing for applying the negative feedback to the gate-to-source voltage Vgs of the driving transistor 22 with the feedback amount ΔV corresponding to an electric current (the drain-to-source current ids) flowing to the driving transistor 22 is mobility correction processing.

A relation between the signal potential (the sampling potential) Vsig of the video signal and the drain-to-source current Ids of the driving transistor 22 according to presence or absence of the threshold correction and the mobility correction in the pixel (the pixel circuit) 20 shown in FIG. 2 is explained with reference to FIGS. 11A to 11C.

Figure 11A:
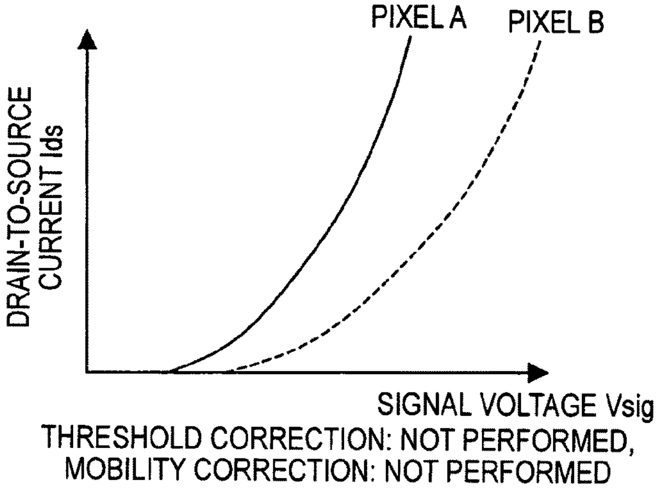
FIGS. 11A to 11C are characteristic chart served for explanation of a relation between signal voltage Vsig of a video signal and a drain-to-source current Ids of the driving transistor according to presence or absence of threshold correction and mobility correction.

FIG. 11A is a graph of a relation between the signal potential Vsig and the drain-to-source current Ids obtained when both the threshold correction processing and the mobility correction processing are not performed. FIG. 11B is a graph of a relation between the signal potential Vsig and the drain-to-source current Ids obtained when the mobility correction processing is not performed and only the threshold correction processing is performed. FIG. 11C is a graph of a relation between the signal potential Vsig and the drain-to-source current Ids obtained when both the threshold correction processing and the mobility correction processing are performed. As shown in FIG. 11A, when both the threshold correction processing and the mobility correction processing are not performed, a large difference occurs in the drain-to-source current Ids between the pixel A and the pixel B because of irregularity in the threshold voltage Vth and the mobility μ in each of the pixels A and B.

Figure 11B:
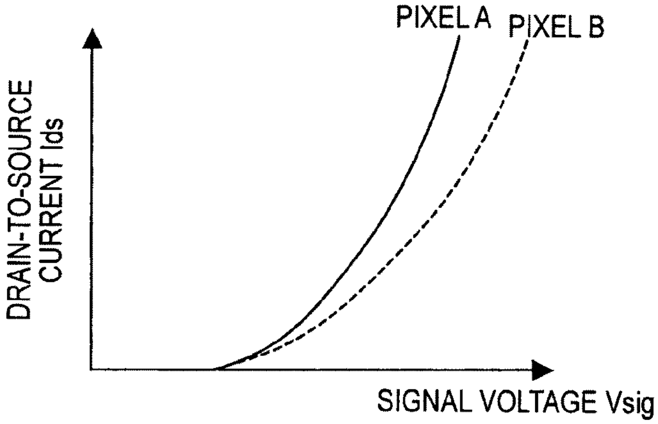
Figure 11C:
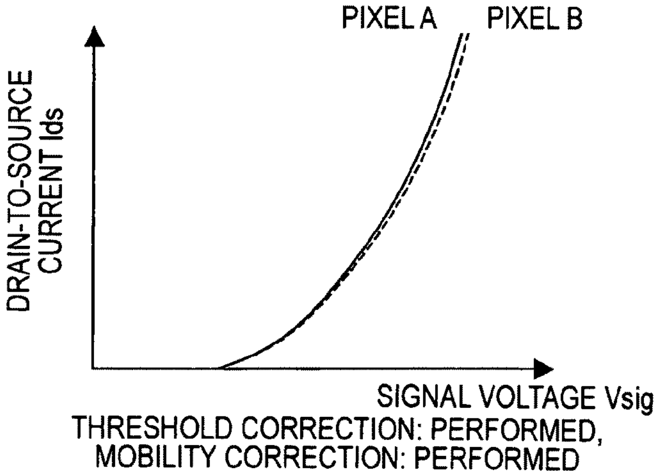

On the other hand, when only the threshold correction processing is performed, as shown in FIG. 11B, although irregularity in the drain-to-source current Ids can be reduced to some extent, a difference in the drain-to-source current Ids between the pixels A and B due to irregularity in the mobility μ in each of the pixels A and B still remains. By performing both the threshold correction processing and the mobility correction processing, as shown in FIG. 11C, the difference in the drain-to-source current Ids between the pixels A and B due to irregularity in the threshold voltage Vth and the mobility μ in each of the pixels A and B can be practically eliminated. Therefore, luminance irregularity of the organic EL element 21 does not occur at any gradation and a display image with a satisfactory quality can be obtained.

The pixel 20 shown in FIG. 2 has the function of the boot strap operation by the storage capacitor 24 explained above in addition to the correction functions of the threshold correction and the mobility correction. Therefore, actions and effects explained below can be obtained.

Even if the source voltage Vs of the driving transistor 22 changes as the I-V characteristic of the organic EL element 21 deteriorates with time, it is possible to maintain the gate-to-source potential Vgs of the driving transistor 22 constant according to the boot strap operation by the storage capacitor 24. Therefore, an electric current flowing to the organic EL element 21 does not change and remains constant. As a result, light emission luminance of the organic EL element 21 is also maintained constant, even if the I-V characteristic of the organic EL element 21 changes with time, it is possible to realize image display without luminance deterioration involved in the aged deterioration.

Deficiencies Involved in a Swing in the Cathode Potential Vcath

As it is evident from the explanation of the circuit operation, the processing for the threshold correction preparation is performed by switching the potential DS of the power supply line 32 from the high potential Vcc to the low potential Vss when the writing transistor 23 is in the OFF state. Since the potential DS of the power supply line 32 changes to the low potential Vss, the driving transistor 22 functions as a switching transistor. Therefore, an electric current flows from the anode side of the organic EL element 21 to the power supply line 32 through the driving transistor 22.

Figure 12:
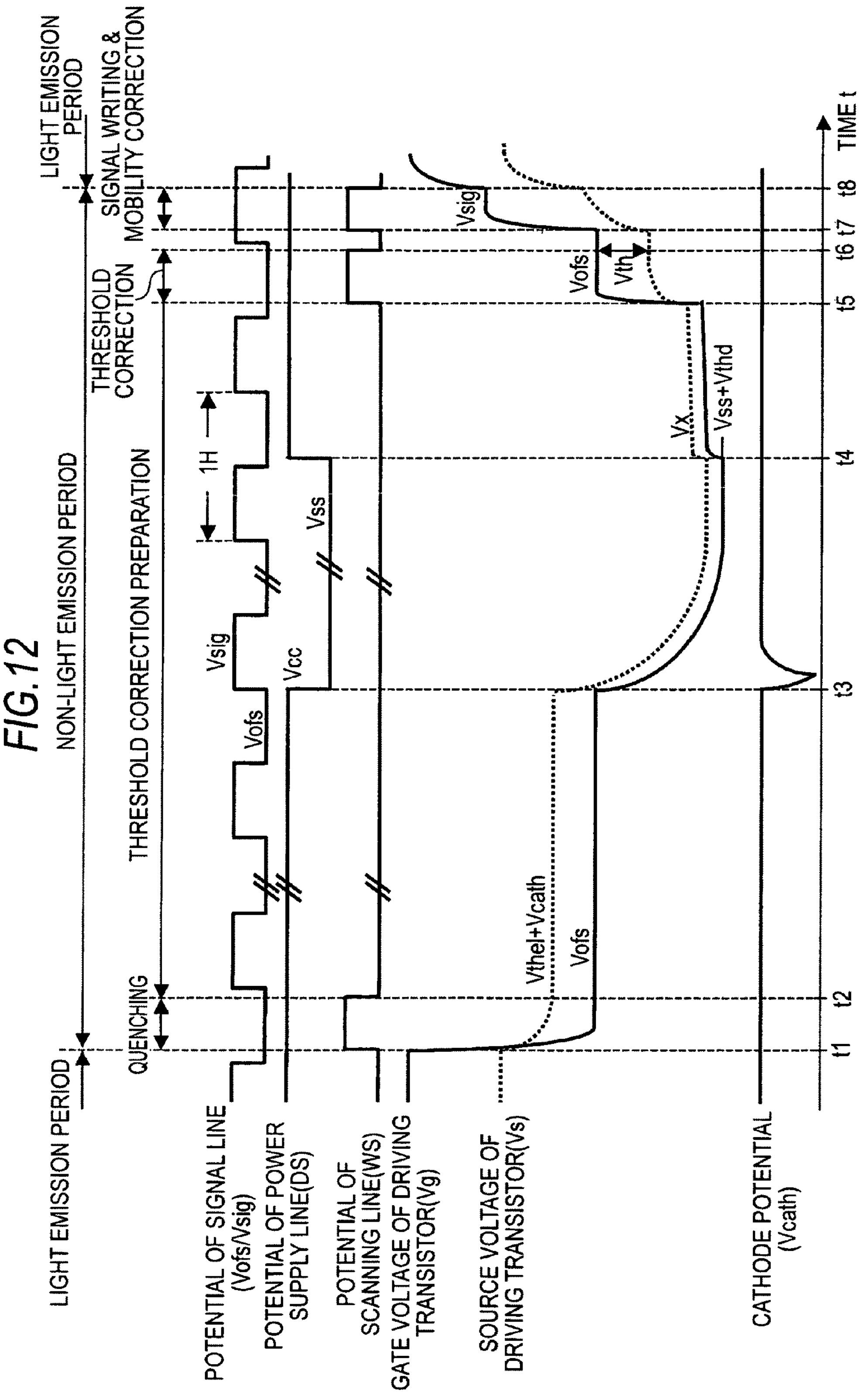
FIG. 12 is a timing waveform chart served for explanation concerning a deficiency involved in a swing in cathode potential Vcath.

In the related art, as shown in a timing waveform chart of FIG. 12, when the potential DS of the power supply line 32 is switched from the high potential Vcc to the low potential Vss, the potential DS is switched at response speed same as that in switching the potential DS from the low potential Vss to the high potential Vcc. Specifically, time in which the power supply potential DS changes from the high potential Vcc to the low potential Vss is set to be the same as time in which the power supply potential DS changes from the low potential Vss to the high potential Vcc.

However, when the potential DS of the power supply line 32 is instantaneously switched with a large potential difference from the high potential Vcc to the low potential Vss, a large electric current suddenly flows from the anode side of the organic EL element 21 to the power supply line 32. Therefore, the source voltage Vs of the driving transistor 22 substantially fluctuates. Then, as shown in the timing waveform chart of FIG. 12, the potential (the cathode potential Vcath) of the common power supply line 34 substantially falls to the negative side.

The cathode electrode of the organic EL element 21 is connected to the common power supply line 34 in common to all the pixels. Therefore, a swing in the potential of the common power supply line 34 is input to the source electrode of the driving transistor 22 in a pixel row (line) currently subjected to the threshold correction processing according to coupling by the parasitic capacitor Cel of the organic EL element 21 and changes the source voltage Vs of the driving transistor 22.

Specifically, when the potential of the common power supply line 34 falls to the negative side, the source voltage Vs of the driving transistor 22 in the line currently subjected to the threshold correction processing falls. Consequently, the gate-to-source voltage Vgs of the driving transistor 22 increases. Conversely, when the potential of the common power supply line 34 rises, since the source voltage Vs of the driving transistor 22 rises, the gate-to-source voltage Vgs of the driving transistor 22 falls.

As explained above, fluctuation in the gate-to-source voltage Vgs of the driving transistor 22 due to a swing in the potential of the common power supply line 34, i.e., the cathode potential Vcath can be corrected by the threshold correction processing after the fluctuation if the fluctuation occurs near the start of the threshold correction processing. However, if the gate-to-source voltage Vgs of the driving transistor 22 fluctuates near the end of the threshold correction processing, the threshold correction that should originally be performed is not performed. Therefore, irregularity occurs in light emission luminance and an image quality failure occurs.

As it is evident from the above explanation, the phenomenon in which the potential of the common power supply line 34, i.e., the cathode potential Vcath swings is a phenomenon peculiar to a display device that adopts a pixel configuration for controlling light emission and non-light emission of pixels according to switching of the potential DS of the power supply line 32.

1-3. Characteristics of an Embodiment

Therefore, in the organic EL display device 10A according to an embodiment, as it is evident from the timing waveform chart of FIG. 4, when the potential DS of the power supply line 32 is dropped from the high potential Vcc to the low potential Vss, the potential DS is more gently changed than that during raising thereof. Specifically, time in which the potential DS of the power supply line 32 changes from the high potential Vcc to the low potential Vss at the preparation stage of the threshold correction processing is set longer than time in which the potential DS of the power supply line 32 changes from the high potential Vcc to the low potential Vss before the threshold correction processing.

Transition of the power supply potential DS from the high potential Vcc to the low potential Vss, i.e., a transient response of falling is set slower than transition from the low potential Vss to the high potential Vcc, i.e., a transient response of rising in this way. Consequently, actions and effects explained below can be obtained. Specifically, if the transient response of the falling of the power supply potential DS is lower than the transient response of the rising, a current amount flowing to the power supply line 32 through the driving transistor 22 decreases.

Then, since fluctuation in the source voltage Vs of the driving transistor 22 decreases, a swing in the potential of the common power supply line 34 decreases. Consequently, a coupling amount input through the parasitic capacitor Cel of the organic EL element 21 is held down with respect to the source voltage Vs of the driving transistor 22 in a pixel row (line) near the end of the threshold correction processing. As a result, since it is possible to normally perform the threshold correction processing in the pixel row near the end of the threshold correction processing, it is possible to suppress occurrence of an image quality failure due to the swing in the potential of the common power supply line 34.

The power supply potential DS, transition from the high potential Vcc to the low potential Vss, i.e., a transient of falling of which is lower than transition from the low potential Vss to the high potential Vcc, i.e., a transient response of rising, is generated by the power supply scanning circuit 50. A specific configuration of the power supply scanning circuit 50 is explained below.

Circuit Example of an Output Stage of the Power Supply Scanning Circuit

Figure 13:
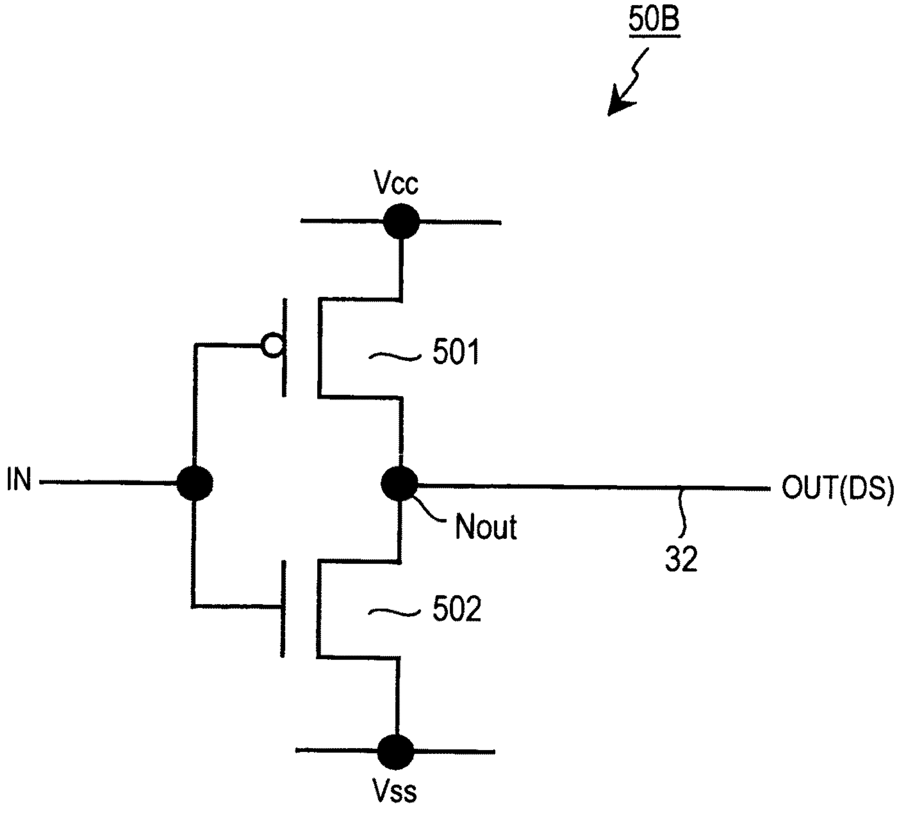
FIG. 13 is a circuit diagram of an example of a circuit configuration at an output stage of a power supply scanning circuit.

FIG. 13 is a circuit diagram of an example of a circuit configuration of an output stage of the power supply scanning circuit 50. A circuit configuration of an output buffer unit 50B as the output stage is shown in the figure. The output buffer unit 50B is provided to correspond to each of the pixel rows of the pixel array unit 30. One output buffer unit 50B corresponding to a certain pixel row is shown as a representative. An output buffer unit having a one-stage configuration is shown as the output buffer unit 50B. However, it goes without saying that the output buffer unit 50B may be an output buffer unit having a multi-stage configuration.

The output buffer unit 50B has a CMOS inverter configuration including a PchMOS transistor 501 and an NchMOS transistor 502, gate electrodes and drain electrodes of which are connected in common, respectively. A source electrode of the PchMOS transistor 501 is connected to a power supply potential Vcc on a positive side. A source electrode of the NchMOS transistor 502 is connected to a power supply potential Vss on a negative side. The power supply line 32 in a corresponding pixel row is connected to a drain common connection node Nout.

In the output buffer unit 50B having the configuration explained above, response characteristics (time constants) of falling and rising of the power supply potential DS depend on ON resistances of the MOS transistors 501 and 502, wiring resistance and parasitic capacitance of the power supply line 32, and the like.

Therefore, transistor size of the NchMOS transistor 502 is set smaller than transistor size of the PchMOS transistor 501. Consequently, since the ON resistance of the NchMOS transistor 502 is larger than the ON resistance of the PchMOS transistor 501, the transient response of the falling of the power supply potential DS is slower than the transient response of the rising.

Figure 14:
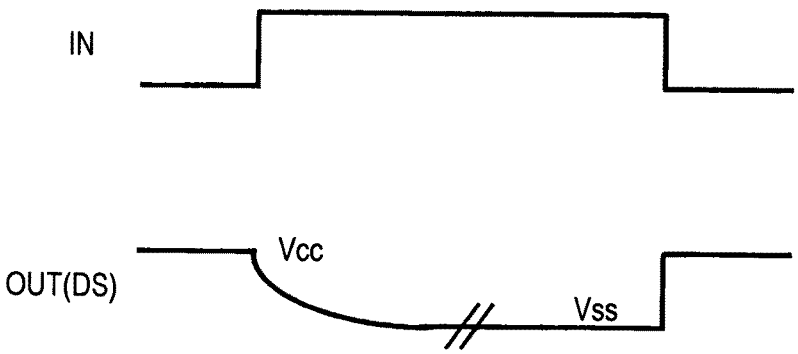
FIG. 14 is a timing waveform chart of input and output waveforms at the output stage of the power supply scanning circuit.

With the configuration explained above, even if a special circuit is not added, it is possible to generate the power supply potential DS, a transient response of falling of which is slower than a transient response of rising, simply by changing the transistor size of the CMOS inverter included in the output buffer unit 50B of the power supply scanning circuit 50. Waveforms of input IN and output OUT(DS) of the output buffer unit 50B are shown in FIG. 14.

2. Another Embodiment 2-1. System Configuration

Figure 15:
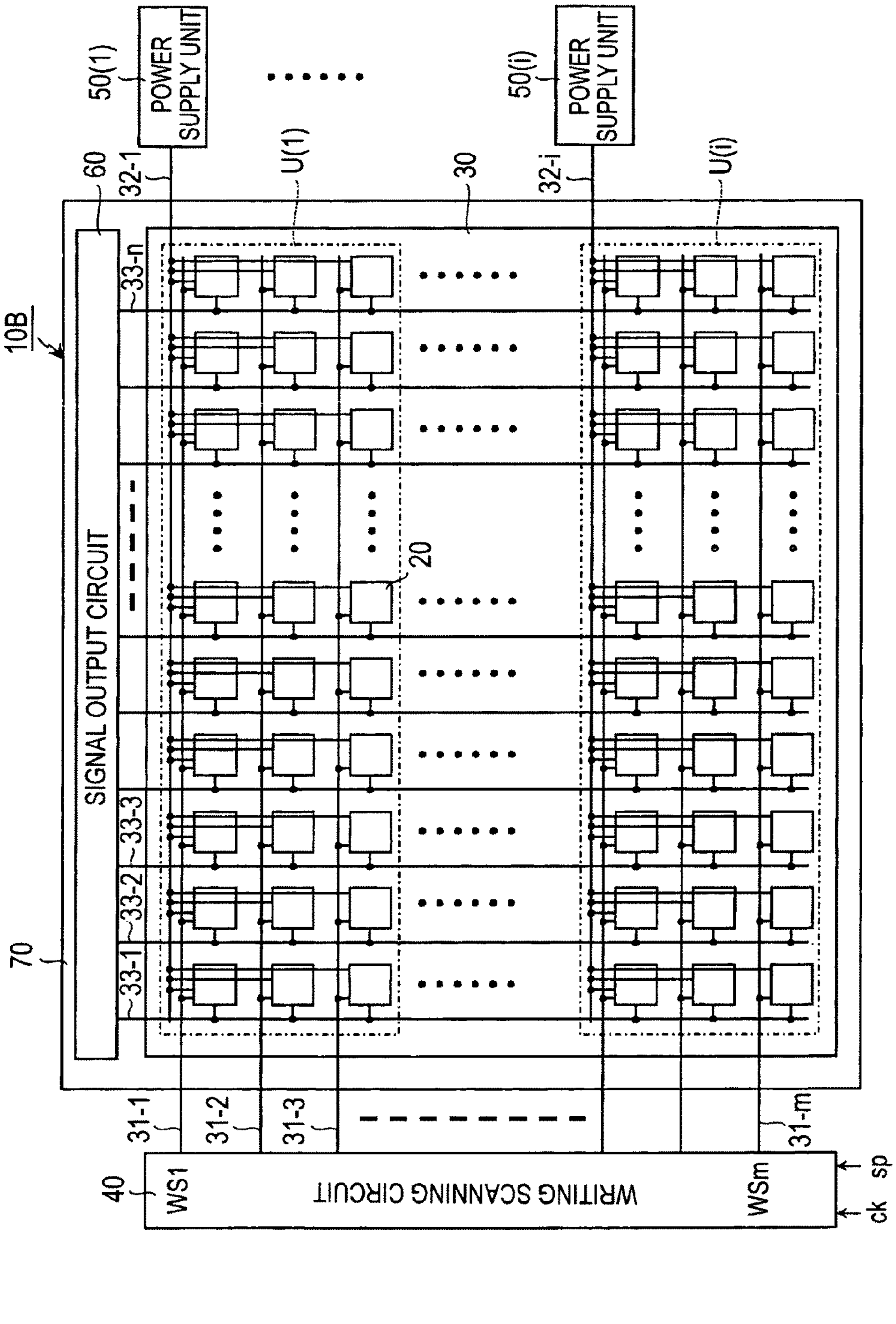
FIG. 15 is a schematic system configuration of a configuration of an organic EL display device according to a second embodiment of the present invention.

FIG. 15 is a schematic system diagram of a configuration of an active matrix display device according to another embodiment of the present invention. Here, as an example, an active matrix organic EL display device in which an electro-optic element of a current driving type, light emission luminance of which changes according to a current value flowing to a device, an organic EL element is used as a light emitting element of a pixel (a pixel circuit) is explained.

The organic EL display device 10A according to an embodiment adopts the configuration in which one power supply line 32 is wired for each of the pixel rows (lines), i.e., one power supply line 32 is wired for one pixel row and switching scanning for the power supply potential DS by the power supply scanning circuit 50 is performed line by line in order.

On the other hand, an organic EL display device 10B according to the second embodiment adopts a configuration in which, with plural pixel rows set as a unit, one power supply line 32 is wired for each of units, i.e., one power supply line 32 is wired for one unit and switching scanning for the power supply potential DS is performed for each of the units in order.

In this specification, performing the switching scanning for the power supply potential DS for each of the units in order is referred to as unit scan. The number of pixel rows (the number of lines) set as one unit is an arbitrary number such as a several tens line unit or a one hundred line unit.

Specifically, as shown in FIG. 15, in the pixel array unit 30 in which the pixels 20 are arranged in a matrix shape, whereas one scanning line 31 is wired for each of pixel rows, one power supply line 32 is wired for each plural pixel rows, i.e., each of the units. For simplification of illustration, three pixel rows are set as each of units U(1), U(2), . . . , and U(i). In other words, one power supply line 32 is wired for three pixel rows.

The power supply line 32 is a scanning line that supplies an electric current for driving the organic EL element 21 to the driving transistor 22. The power supply potential DS thereof is switched between the high potential Vcc and the low potential Vss. Therefore, a circuit size of a circuit section corresponding one pixel row of the power supply scanning circuit 50 that drives the power supply line 32 is inevitably large compared with the writing scanning circuit 40. The circuit section corresponding to one pixel row is provided by a number equivalent to the number of pixels rows of the pixel array unit 30. Therefore, the size of the entire power supply scanning circuit 50 is extremely large and cost increases because of the size.

On the other hand, by adopting a unit scan system according to this embodiment, it is possible to set the size of the entire power supply scanning circuit 50 extremely small compared with the size set when the unit scan system is not adopted. As explained concerning the organic EL display device 10A according to the first embodiment, in general, the power supply scanning circuit 50 includes the shift register and the output buffer unit 50B.

On the other hand, by adopting the unit scan system and increasing the number of lines per one unit to thereby set the number of units small, a simple configuration shown in FIG. 15 can be adopted. Specifically, instead of the power supply scanning circuit 50, power supply units 50(1), 50(2), . . . , and 50(*i*) equivalent to the output buffer unit 50B only have to be provided to correspond to the units U(1), U(2), . . . , and U(i). Each of the power supply units 50(1), 50(2), . . . , and 50(*i*) only has to be driven by a timing control unit (not shown in the figure) in synchronization with vertical scanning by the writing scanning circuit 40.

As explained above, with the organic EL display device 10B that adopts the unit scan system, a circuit size of the entire circuit sections equivalent to the power supply scanning circuit 50, i.e., the power supply units 50(1), 50(2), . . . , and 50(*i*) can be set extremely small compared with the power supply scanning circuit 50. Therefore, a reduction in cost of the entire display device can be realized.

In FIG. 15, a circuit configuration and pixel structure of the pixels 20 and configurations of the writing scanning circuit 40 and the signal output circuit 60 are basically the same as those in an embodiment. Therefore, redundant explanation thereof is omitted.

2-2. Circuit Operation

A circuit operation of the organic EL display device 10B according to the second embodiment having the configuration explained above is the same as that of the organic EL display device 10A according to the first embodiment. Specifically, in the organic EL display device 10A according to the first embodiment, the switching scanning for the power supply potential DS is performed line by line in order. The organic EL display device 10B according to the second embodiment is different only in that the switching scanning for the power supply potential DS is performed for each of the units U(1), U(2), . . . , and U(i) in order.

Specifically, in the organic EL display device 10B according to the another embodiment, as in the organic EL display device 10A according to an embodiment, threshold correcting operation, mobility correcting operation, boot strap operation, and the like are performed. Consequently, even if there is irregularity in characteristics in the driving transistor 22 or the I-V characteristic of the organic EL element 21 changes with time, high-quality image display without luminance irregularity and luminance deterioration can be realized.

Deficiencies Involved in a Swing in the Cathode Potential Vcath

Even in the organic EL display device 10B that adopts the unit scan system, occurrence of deficiencies involved in a swing in the potential of the common power supply line 34, i.e., a swing in the cathode potential Vcath of the organic EL element 21 is inevitable. Deficiencies involved in the swing in the cathode potential Vcath of the organic EL element 21 particularly conspicuously appear in the organic EL display device 10B that adopts the unit scan system.

This is because the threshold correction preparation performed by switching the power supply potential DS from the high potential Vcc to the low potential Vss and feeding an electric current from the anode side of the organic EL element 21 to the power supply line 32 is performed in each unit. In other words, since the operation of the threshold correction preparation is performed simultaneously in all lines in a unit in which switching timing for the power supply potential DS is the same, fluctuation in the source voltage Vs of the driving transistor 22 is extremely large. Specifically, the fluctuation in the source voltage Vs of the driving transistor 22 is as large as a degree obtained by multiplying, by the number of lines of the unit, fluctuation that occurs when the switching scanning for the power supply potential DS is performed line by line.

Figure 16:
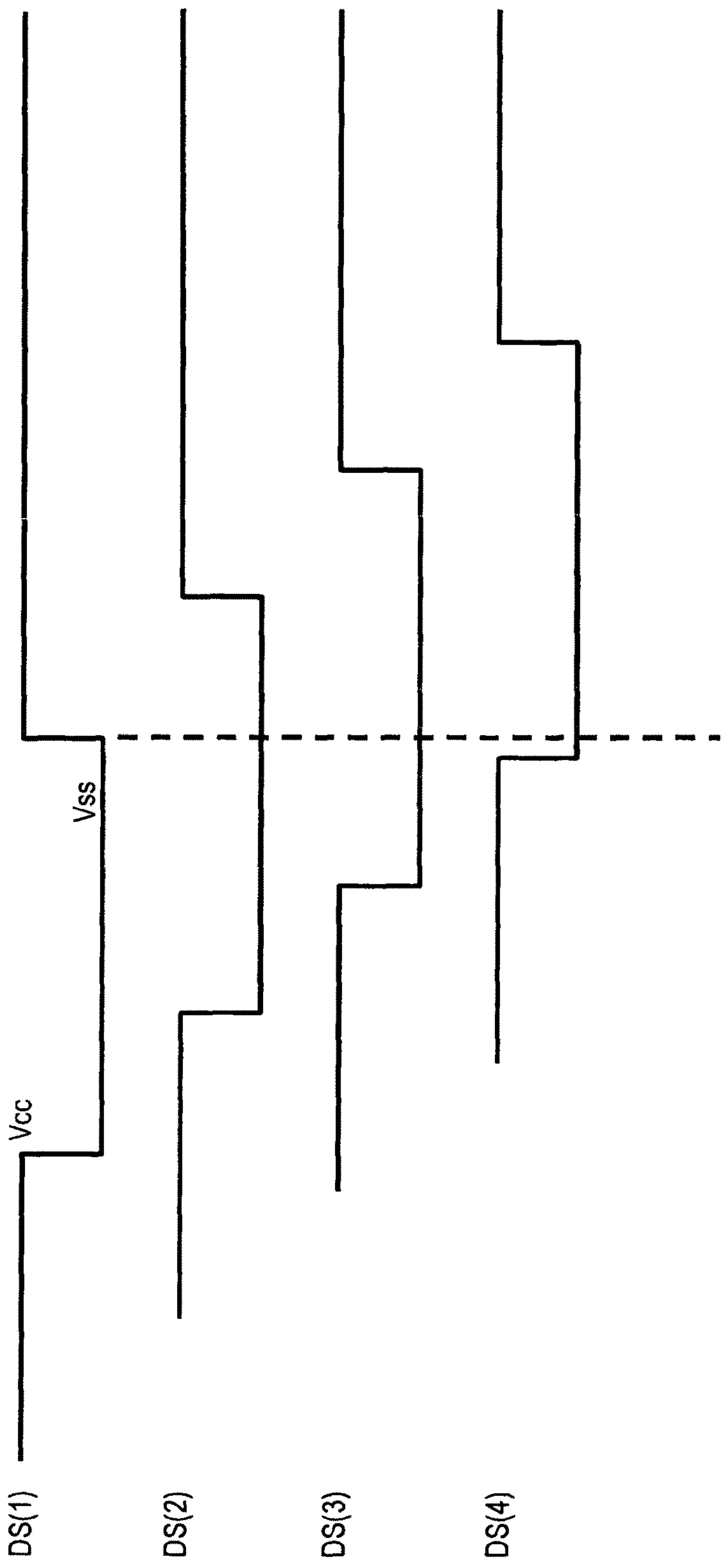
FIG. 16 is a timing waveform chart of only timing of power supply potential DS extracted in a threshold correction preparation period.

Only timing of the potential (the power supply potential) DS of the power supply line 32 extracted from a threshold correction preparation period is discussed. As shown in FIG. 16, when a unit of a power supply potential DS(1) starts the threshold correction processing, the power supply potential DS(4) falls. Therefore, the potential of the common power supply line 34, i.e., the cathode potential Vcath of the organic EL element 21 swings to the threshold correction processing of the unit of the power supply potential DS(1).

This swing is large because fluctuation in the source voltage Vs of the driving transistor 22 is large compared with fluctuation that occurs when the switching scanning for the power supply potential DS is performed line by line. If the gate-to-source voltage Vgs of the driving transistor 22 fluctuates near the end of the threshold correction processing, the threshold correction processing that should originally be performed is not performed. As a result, in the case of the unit scan system, irregularity occurs in light emission luminance and image quality failures such as a bright band and a dark band occur.

In the timing waveform chart of FIG. 16, power supply potential DS(1) represents power supply potential of a first unit U(1) and power supply potential DS(2) represents power supply potential of a second unit U(2). Power supply potential DS(3) represents power supply potential of a third unit U(3) and power supply potential DS(4) represents power supply potential of a fourth unit U(4).

2-3. Characteristics of the Second Embodiment

Therefore, the organic EL display device 10B according to the second embodiment adopts a configuration for changing, when the power supply potential DS is dropped from the high potential Vcc to the low potential Vss, the potential DS is more gently changed than that during raising thereof. Specifically, time in which the potential DS of the power supply line 32 changes from the high potential Vcc to the low potential Vss at the preparation stage of the threshold correction processing is set longer than time in which the potential DS of the power supply line 32 changes from the high potential Vcc to the low potential Vss before the threshold correction processing (see FIG. 4).

When a transient response of the falling of the power supply potential DS is set slower than a transient response of the rising, a current amount flowing to the power supply line 32 through the driving transistor 22 decreases. Then, since a swing in the source voltage Vs of the driving transistor 22 decreases, a swing in the potential of the common power supply line 34 decreases. Consequently, a coupling amount input through the parasitic capacitor Cel of the organic EL element 21 is held down with respect to the source voltage Vs of the driving transistor 22 of a unit near the end of the threshold correction processing.

As a result, since it is possible to normally perform the threshold correction processing in a pixel row near the end of the threshold correction processing, it is possible to suppress occurrence of an image quality failure due to a swing in the potential of the common power supply line 34. In particular, in the organic EL display device 10B that adopts the unit scan system, a swing in the potential of the common power supply line 34 is large compared with a swing that occurs when the switching scanning for the power supply potential DS is performed line by line. Therefore, it can be said that an effect obtained by holding down the swing is extremely significant.

3. Modifications

In the embodiments, when the power supply potential DS changes from the high potential Vcc to the low potential Vss, the power supply potential DS changes from the high potential Vcc to the low potential Vss with predetermined response characteristics. However, the present invention is not limited to this. As explained above, the predetermined response characteristics depend on ON resistances of the CMOS transistors 501 and 502 included in the output buffer unit (see FIG. 13), wiring resistance and parasitic capacitance of the power supply line 32, and the like.

Figure 17:
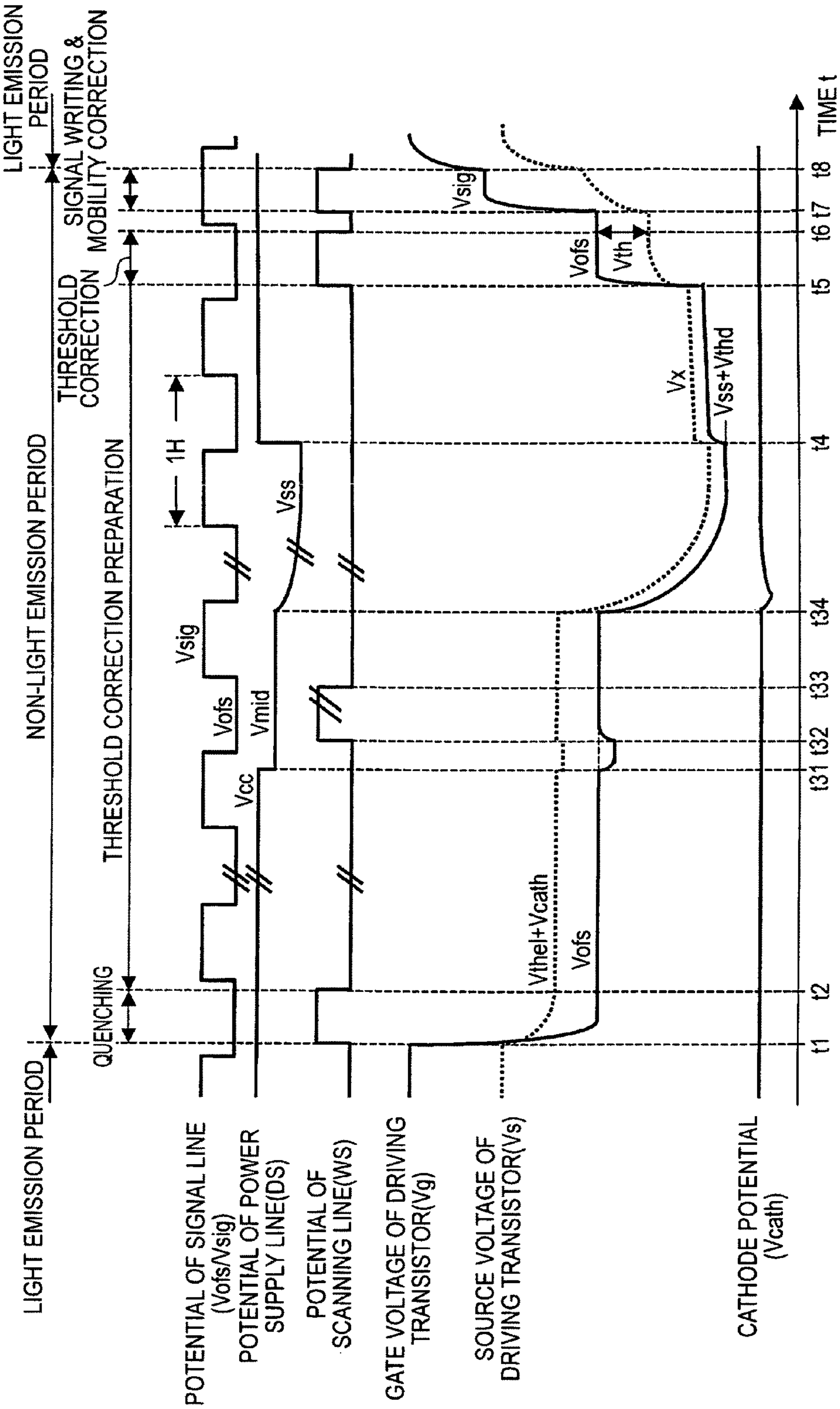
FIG. 17 is a timing waveform chart served for explanation of circuit operation performed when power supply potential DS according to a modification of the present invention is used.

As a modification of the embodiments, as shown in FIG. 17, the power supply potential DS has three values, i.e., the high potential Vcc, intermediate potential Vmid, and the low potential Vss. In the threshold correction preparation period, at time t31, the power supply potential DS is once changed from the high potential Vcc to the intermediate potential Vmid to change the writing transistor 23 to the ON state. An amount of change in the power supply potential DS at this point is smaller than an amount of change that occurs when the power supply potential DS is switched from the high potential Vcc to the low potential Vss. Therefore, coupling from the power supply line 32 to the gate voltage Vg of the driving transistor 22 can be reduced.

However, even in this case, since the gate voltage Vg of the driving transistor 22 slightly falls because of slight coupling, the potential of the scanning line 31 is changed to a high potential state in a period of time t32 to t33 in which the potential of the signal line 33 is at the reference potential Vofs. Consequently, since the writing transistor 23 changes to the ON state, the gate voltage Vg of the driving transistor 22 changes to the reference potential Vofs. Therefore, by changing the power supply potential DS from the intermediate potential Vmid to the low potential Vss with the predetermined response characteristics at time t34, it is possible to hold down fluctuation in the cathode potential Vcath due to fluctuation in the source voltage Vs of the driving transistor 22.

In this modification, as in the embodiments, it is possible to hold down a coupling amount input from the power supply line 32 with respect to the source voltage Vs of the driving transistor 22 near the end of the threshold correction processing. Therefore, it is possible to normally perform the threshold correction processing. As a result, it is possible to suppress occurrence of image quality failures such as a bright band and a dark band.

In the example explained in the embodiments, the driving circuit of the organic EL element 21 has the 2Tr circuit configuration including the two transistors (Tr), i.e., the driving transistor 22 and the writing transistor 23. However, the present invention is not limited to the application to the 2Tr circuit configuration.

For example, the driving circuit may adopt a circuit configuration in which the reference potential Vofs for initializing the gate voltage Vg of the driving transistor 22 is written from the signal line 33 by a dedicated switching transistor rather than by the writing transistor 23.

In short, the present invention can be applied to a pixel configuration in general that adopts a configuration for controlling light emission and non-light emission by switching the potential of the power supply line 32 that supplies an electric current for driving the organic EL element 21 to the driving transistor 22.

In the example explained in the embodiments, the present invention is applied to the organic EL display device in which the organic EL element is used as the electro-optic element of the pixel. However, the present invention is not limited to this application example. Specifically, the present invention can be applied to a display device in general in which the electro-optic element (light emitting element) of the current driving type, light emission luminance of which changes according to a current value flowing to a device, such as an inorganic EL element, a LED element, or a semiconductor laser element is used.

4. Application Examples

The display device according to the present invention explained above can be applied to a display device of an electronic apparatus in every field that displays, as an image or a video, a video signal input to the electronic apparatus or a video signal generated in the electronic apparatus.

With the display device according to the present invention, it is possible to hold down a swing in the potential of the common power supply line in the threshold correction preparation period and suppress occurrence of an image quality failure due to the swing in the potential. Therefore, by using the display device according to the embodiments as a display device of an electronic apparatus in every field, it is possible to improve a display quality of the display device of the electronic apparatus.

The display device according to the present invention also includes a display device of a module shape having a sealed configuration. As the display device of the module shape, for example, there is a display module formed by bonding a transparent opposed unit of glass or the like to a pixel array unit. In the transparent opposed unit, a color filter, a protective film, and the like as well as the light blocking film explained above may be provided. In the display module, a circuit unit, an FPC (flexible print circuit), or the like for inputting and outputting a signal and the like from the outside to the pixel array unit may be provided.

Specific examples of the electronic apparatus to which the present invention is applied are explained. As an example, the present invention can be applied to various electronic apparatuses shown in FIGS. 18 to 22, for example, portable terminal apparatuses such as a digital camera, a notebook personal computer, and a cellular phone and display apparatuses such as a video camera.

Figure 18:
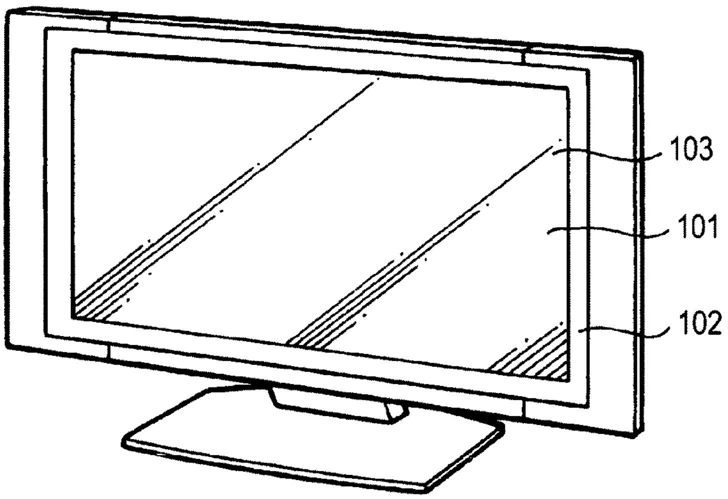
FIG. 18 is a perspective view of an external appearance of a television set to which the present invention is applied.

FIG. 18 is a perspective view of an external appearance of a television set to which the present invention is applied. The television set according to this application example includes a video display screen unit 101 including a front panel 102 and a filter glass 103. The television set according to this application example is manufactured by using the display device according to the present invention as the video display screen unit 101.

Figure 19A:
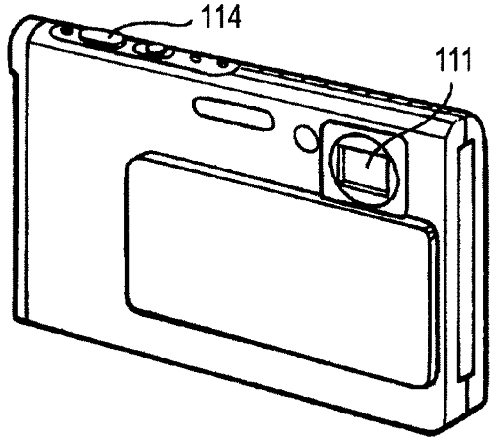
Figure 19B:
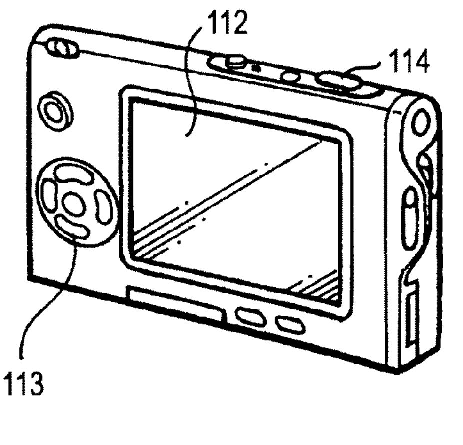

FIGS. 19A and 19B are perspective view of an external appearance of a digital camera to which the present invention is applied. FIG. 19A is a perspective view of the external appearance viewed from a front side. FIG. 19B is a perspective view of the external appearance viewed from a rear side. The digital camera according to this application example includes a light emitting section 111 for flash, a display unit 112, a menu switch 113, and a shutter button 114. The digital camera according to this application example is manufactured by using the display device according to the present invention as the display unit 112.

Figure 20:
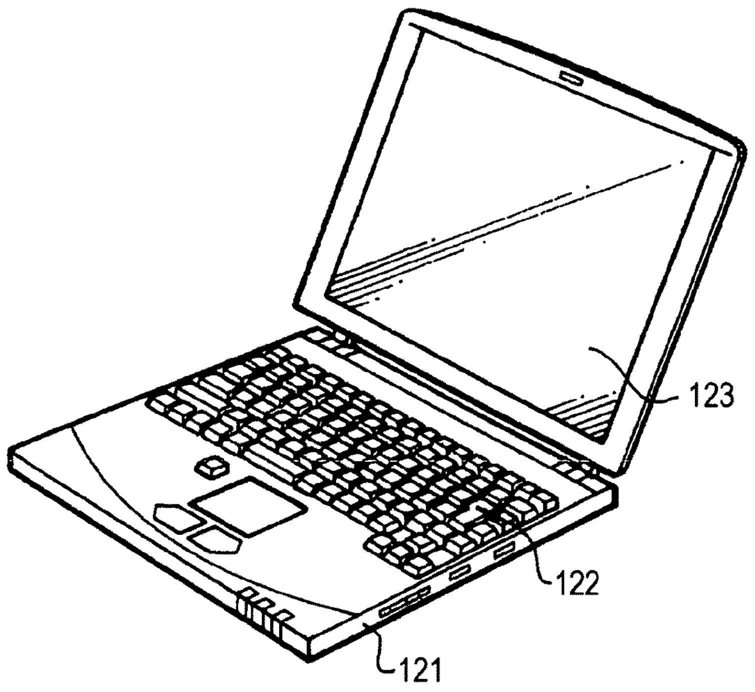
FIG. 20 is a perspective view of an external appearance of a notebook personal computer to which the present invention is applied.

FIG. 20 is a perspective view of an external appearance of a notebook personal computer to which the present invention is applied. The notebook personal computer according to this application example includes, in a main body 121, a keyboard 122 operated when characters and the like are input and a display unit 123 that displays an image. The notebook personal computer according to this application example is manufactured by using the display device according to the present invention as the display unit 123.

Figure 21:
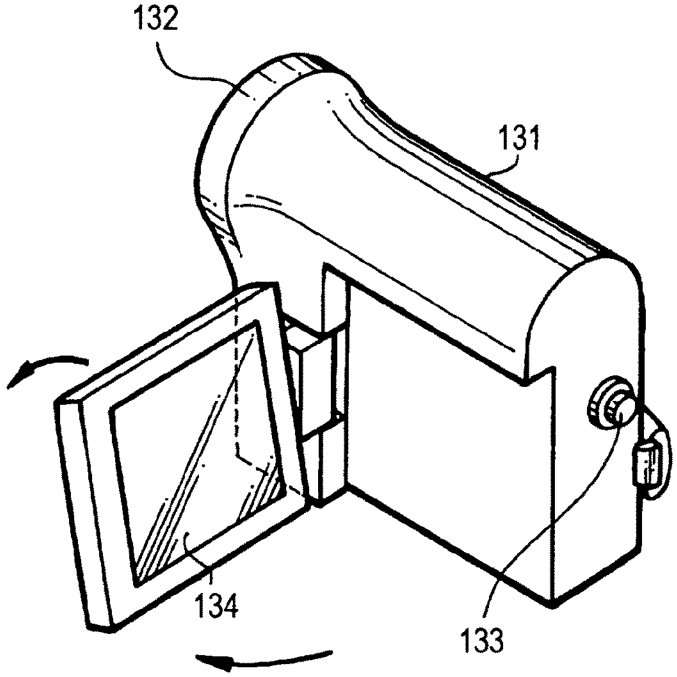
FIG. 21 is a perspective view of an external appearance of a video camera to which the present invention is applied.

FIG. 21 is a perspective view of an external appearance of a video camera to which the present invention is applied. The video camera according to this application example includes a main body unit 131, a lens 132 for subject photographing provided on a side facing the front, a start and stop switch 133 for photographing, and a display unit 134. The video camera according to this application example is manufactured by using the display device according to the present invention as the display unit 134.

Figures 22A, 22B, 22C, 22D, 22E, 22F, 22G:
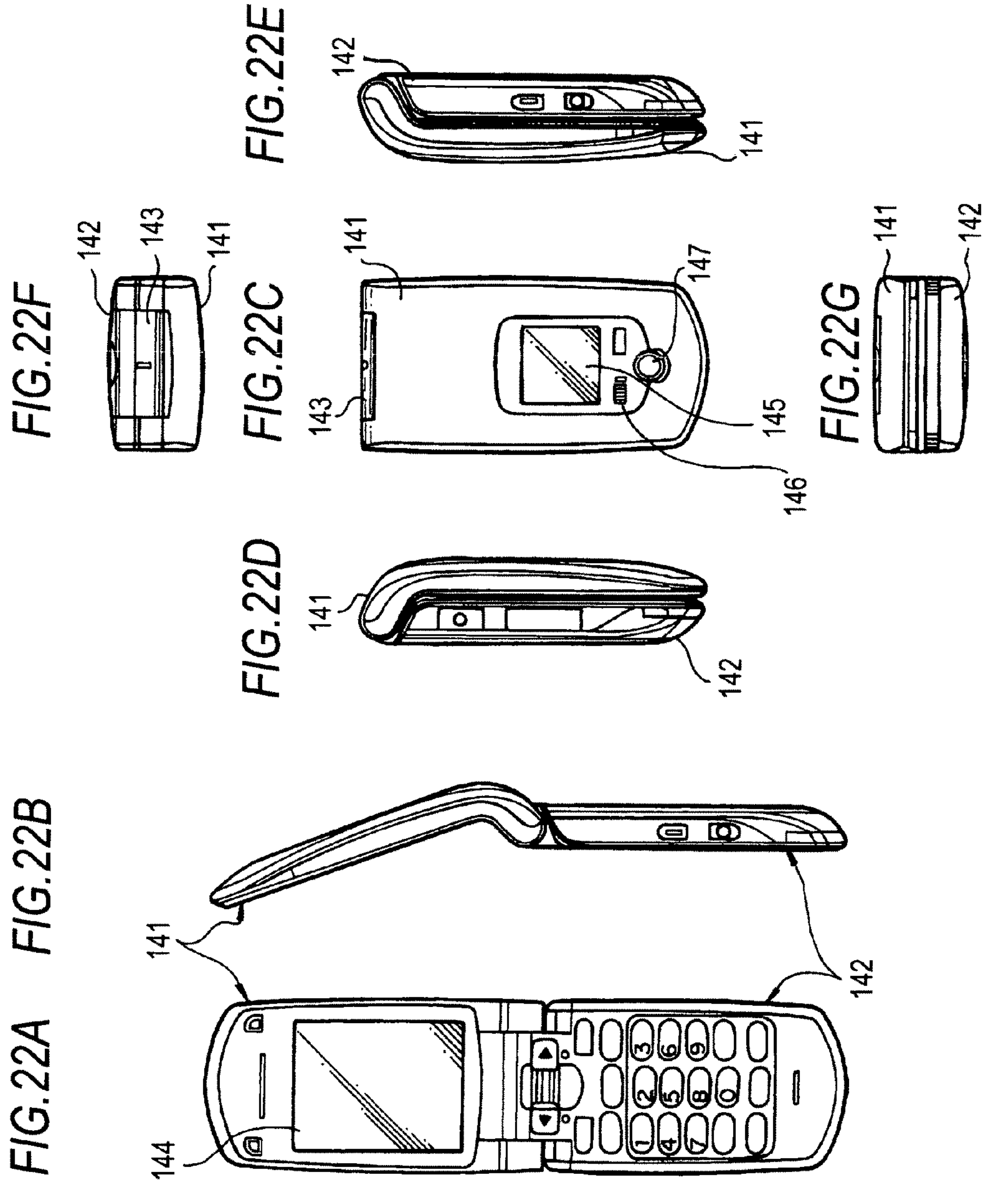

FIGS. 22A to 22G are external views of a portable terminal apparatus, for example, a cellular phone to which the present invention is applied. FIG. 22A is a front view in an open state, FIG. 22B is a side view in the open state, FIG. 22C is a front view in a closed state, FIG. 22D is a left side view, FIG. 22E is a right side view, FIG. 22F is a top view, and FIG. 22G is a bottom view.

The cellular phone according to this application example includes an upper housing 141, a lower housing 142, a coupling unit (a hinge unit) 143, a display 144, a sub-display 145, a picture light 146, and a camera 147. The cellular phone according to this application example is manufactured by using the display device according to the present invention as the display 144 and the sub-display 145.

The present application contains subject matter related to that disclosed in Japanese Priority Patent Application JP 2008-320600 filed in the Japan Patent Office on Dec. 17, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a pixel array unit in which pixels are arranged in a matrix shape, each of the pixels including an electro-optic element, a writing transistor that writes a video signal, a driving transistor that drives the electro-optic element according to the video signal written by the writing transistor, and a storage capacitor that is connected between a gate terminal and a first current terminal of the driving transistor and stores the video signal written by the writing transistor; and a power supply line configured to supply a power supply potential to the second current terminal of the driving transistor, the power supply potential selectively taking a first potential for supplying an electric current to the driving transistor and a second potential for applying reverse bias to the electro-optic element, wherein a first time period of the power supply potential changing from the first potential to the second potential precedes a second time period of the power supply potential changing from the second potential to the first potential, the first time period is longer than the second time period, and the first time period and the second time period occur at a preparation stage of threshold correction processing before the threshold correction processing, the threshold correction processing being processing for changing, relative to an initialized potential obtained when a gate voltage of the driving transistor is initialized with a reference potential, a source voltage of the driving transistor to a potential obtained by subtracting a threshold voltage of the driving transistor from the initialized potential, wherein the gate voltage is lower than the source voltage throughout the preparation stage of threshold correction processing.

2. The display device according to claim 1, wherein the potential of the power supply line changes from the first potential to the second potential with a predetermined response characteristic when the potential changes from the first potential to the second potential.

3. The display device according to claim 2, wherein an output stage of a scanning circuit that selectively outputs the first potential or the second potential to the power supply line has a CMOS inverter connected between a power supply of the first potential and a power supply of the second potential, and size of a transistor on the second potential side of the CMOS inverter is smaller than size of a transistor on the first potential side.

4. The display device according to claim 3, wherein the predetermined response characteristic depends on the size of the transistor on the second potential side of the CMOS inverter and wiring resistance and parasitic capacitance of the power supply line.

5. The display device according to claim 1, wherein the power supply line is wired with plural pixel rows set as a unit.

6. A driving method for a display device including a pixel array unit in which pixels are arranged in a matrix shape, each of the pixels including an electro-optic element, a writing transistor that writes a video signal, a driving transistor that drives the electro-optic element according to the video signal written by the writing transistor, and a storage capacitor that is connected between a gate terminal and a first current terminal of the driving transistor and stores the video signal written by the writing transistor; and a power supply line configured to supply a power supply potential to a second current terminal of the driving transistor, the power supply potential selectively taking a first potential for supplying an electric current to the driving transistor and a second potential for applying reverse bias to the electro-optic element, the method comprising:

setting a first time period of the power supply potential changing from the first potential to the second potential which precedes a second time period of the power supply potential changing from the second potential to the first potential, providing the first time period which is longer than the second time period, and allowing the first time period and the second time period to occur at a preparation stage of threshold correction processing before the threshold correction processing, the threshold correction processing being processing for changing, relative to an initialized potential obtained when a gate voltage of the driving transistor is initialized with a reference potential, a source voltage of the driving transistor to a potential obtained by subtracting a threshold voltage of the driving transistor from the initialized potential, wherein the gate voltage is lower than the source voltage throughout the preparation stage of threshold correction processing.

7. An electronic apparatus including a display device, comprising:

a pixel array unit in which pixels are arranged in a matrix shape, each of the pixels including an electro-optic element, a writing transistor that writes a video signal, a driving transistor that drives the electro-optic element according to the video signal written by the writing transistor, and a storage capacitor that is connected between a gate terminal and a first current terminal of the driving transistor and stores the video signal written by the writing transistor; and a power supply line configured to supply a power supply potential to a second current terminal of the driving transistor, the power supply potential selectively taking a first potential for supplying an electric current to the driving transistor and a second potential for applying reverse bias to the electro-optic element, wherein a first time period of the power supply potential changing from the first potential to the second potential precedes a second time period of the power supply potential changing from the second potential to the first potential, the first time period is longer than the second time period, and the first time period and the second time period occur at a preparation stage of threshold correction processing before the threshold correction processing, the threshold correction processing being processing for changing, relative to an initialized potential obtained when a gate voltage of the driving transistor is initialized with a reference potential, a source voltage of the driving transistor to a potential obtained by subtracting a threshold voltage of the driving transistor from the initialized potential, wherein the gate voltage is lower than the source voltage throughout the preparation stage of threshold correction processing.

8. The display device according to claim 1, wherein an output stage of a scanning circuit that selectively outputs the first potential or the second potential to the power supply line has a CMOS inverter connected between a power supply of the first potential and a power supply of the second potential, and size of a transistor on the second potential side of the CMOS inverter is smaller than size of a transistor on the first potential side.

9. The display device according to claim 8, wherein the predetermined response characteristic depends on the size of the transistor on the second potential side of the CMOS inverter and wiring resistance and parasitic capacitance of the power supply line.

10. The display device according to claim 1, wherein the gate voltage of the driving transistor is higher than the source voltage of the driving transistor during the threshold correcting processing, and at the end of the threshold correcting processing, a difference between the gate voltage and the source voltage is the threshold voltage.

11. The display device according to claim 1, wherein the first potential is higher than the second potential.

* * * * *